(12) United States Patent
Chow

(10) Patent No.: US 7,657,409 B2
(45) Date of Patent: Feb. 2, 2010

(54) SIMULATION TECHNIQUES

(75) Inventor: Peter Chow, Hayes Middlesex (GB)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 12/292,756

(22) Filed: Nov. 25, 2008

(65) Prior Publication Data

US 2009/0138246 A1    May 28, 2009

(30) Foreign Application Priority Data

Nov. 27, 2007 (GB) ................................. 0723222.6

(51) Int. Cl.
*G06F 17/10* (2006.01)
(52) U.S. Cl. .................. 703/2; 702/66; 702/13
(58) Field of Classification Search ............ 703/2, 703/9, 10; 702/66, 50, 13
See application file for complete search history.

(56) References Cited

U.S. PATENT DOCUMENTS

| 6,519,553 | B1 * | 2/2003 | Barnette et al. ............... 703/2 |
| 2003/0050760 | A1 * | 3/2003 | Namiki ........................ 702/66 |
| 2003/0060988 | A1 * | 3/2003 | Ginzburg ...................... 702/50 |
| 2006/0015306 | A1 * | 1/2006 | Chow .......................... 703/2 |
| 2007/0043543 | A1 * | 2/2007 | Wandzura ...................... 703/2 |
| 2008/0077367 | A1 * | 3/2008 | Odajima ........................ 703/2 |
| 2008/0126047 | A1 * | 5/2008 | Lukis et al. .................... 703/9 |
| 2008/0288172 | A1 * | 11/2008 | Stone .......................... 702/13 |

FOREIGN PATENT DOCUMENTS

EP    1 617 309    1/2006

OTHER PUBLICATIONS

T. Hagstrom, et al., "Radiation boundary conditions for Maxwell's equations: a review of accurate time-domain formulations" Journal of Compuatational Mathematics ICMSEC Chinese Academy of Sciences China, No. 3, May 2007, pp. 305-336.
K. S. Yee: "Numerical Solution of Initial Boundary Value Problems Involving Maxwell's Equations in Isotropic Media", IEEE Transactions on Antennas and Propagation, IEEE Service Center, Piscataway, NJ, US, vol. 14, No. 8, May 1, 1996, pp. 302-307.

(Continued)

*Primary Examiner*—Paul L Rodriguez
*Assistant Examiner*—Kandasamy Thangavelu
(74) *Attorney, Agent, or Firm*—Staas & Halsey LLP

(57) ABSTRACT

A method for assessing wave propagation in a physical system by numerical simulation; a computational domain comprises first grid cells with a first-grid time step, refined second grid cells with a second-grid time step, and intermediate grid cells of first-grid cell size and second-grid time step, with solution points located on the cells; obtaining values of a physical quantity after a first-grid time step at a solution point of one first-grid cell; using values from the first grid to obtain values at a perimeter of the intermediate grid; obtaining values of the physical quantity after the second-grid time step; using values from the intermediate grid to obtain the values at the perimeter of the second grid; using the values at the perimeter of the second grid, to obtain values of the physical quantity after a second-grind time step for solution points of the second-grind cell.

20 Claims, 15 Drawing Sheets

OTHER PUBLICATIONS

European Search Report issued Mar. 4, 2009 in corresponding European Patent Application 08168751.9.

N. Venkataraylu et al. "A Stable FDTD Subgrdding Method Based on Finite Element Formulation With Hanging Variables" IEEE Transactions on Antennas and Propagation, vol. 55, No. 3, Mar. 2007; pp. 907-915.

K. Xiao et al. "A three-dimensional FDTD subgridding method with separate spatial and temporal subgridding interfaces" IEEE, 2005; pp. 578-583.

F. Collino et al. "A space-time mesh refinement for the 1D Maxwell's system" C.R. Acad. Sci. Paris, vol. 328, Series 1, 1999; pp. 263-268.

J. Rantakokko "Partitioning strategies for structured multiblock grids" Parallel Computing 26 (2000); pp. 1661-1680.

C. Vuik et al. "Coarse grid acceleration of a parallel block preconditioner" Future Generation Computer Systems 17 (2001); pp. 933-940.

Search Report issued Mar. 17, 2008 in priority United Kingdom Patent Application No. 0723222.6.

* cited by examiner

SIMULATION TECHNIQUES

The present invention relates to computer-implemented techniques for the numerical approximation of a system to be simulated and, particularly, to the analysis of electromagnetic fields using such techniques. The present invention finds particular, but not exclusive, application to the analysis of electromagnetic fields using the FDTD (Finite-Difference Time-Domain) technique to solve the Maxwell Equations and thus to simulate and forecast the dynamics of electromagnetic wave propagation for a given environment and conditions.

BACKGROUND

There is an ever increasing need to simulate and consider the effect of a wide variety of wave phenomena, such as electromagnetic wave propagation, arising in a variety of environments. Being able to simulate, for example, the dynamics of fluid propagation, heat transfer or electromagnetic radiation is highly advantageous in a number of industries. In particular, electromagnetic field simulation plays an important role in the design and development of electronic products. In this rapidly-changing technology, the time taken in bringing a product to the market place can be critical in maintaining a commercial advantage. In this regard, electromagnetic simulation can provide a highly advantageous tool for design engineers in advancing the development of a device. It may be used, for example, to approximate the surface currents and interior fields arising in complex electronic objects. Electromagnetic simulation is also employed to analyze the electromagnetic radiation emitted by electronic devices, particularly mobile communication devices, in order to assess the health and safety issues for these devices. Furthermore, the study of electromagnetic scattering plays a central role in the design of many complex structures, such as aircrafts, in order to optimize the design and shape of a structure surface. The simulation of convective heat transfer is a useful aid in the analysis and development of ventilation (cooling and/or heating) systems such as those employed in electronic devices. It also provides a tool suitable for use in fire simulation methods which seek to consider the potential fire hazards arising in the electronics industry and other industries.

Generally speaking, the main steps involved in any modeling process are:

1) To define the geometry of a system (i.e. structure or environment) under consideration on a structured grid, taking into account the need to impose boundary conditions on the finite grid as well as the material properties (e.g., for electromagnetic modeling, the magnetic permittivity $\epsilon$, the magnetic permeability $\mu$, and the electric conductivity $\sigma$ should be defined);
2) To calculate the numerical solutions for the physical phenomenon under consideration at each node within the grid at a given instant in time; and
3) To provide means for visualizing and potentially manipulating the solutions obtained at each time step of the calculation.

One scheme which finds use in such modeling methods is the FDTD scheme. It was first proposed by Yee in 1966 and is used in a number of computational simulation tools for analyzing the behaviour of electromagnetic propagation within a one-, two-, or three-dimensional domain. Broadly speaking, the scheme employs a finite difference and finite time domain approach to discretise the differential form of Maxwell's equations. By this method, derivatives of the electric and magnetic field variables required by Maxwell's equations are approximated by spatial finite differences and the calculation then proceeds in a series of time steps.

In accordance with the FDTD technique, the computational domain or "space" in which the simulation will be performed is represented by a Cartesian grid, discrete in both time and space, comprising a plurality of cells in one, two or three dimensions. FIG. 3 shows a three-dimensional cell, each point of the cell being represented by a set of integers (i, j, k), where i, j and k are grid coordinate numbers in the x-axis, y-axis and z-axis directions respectively. Each of the cells comprises a number of solution points or nodes for the electric and magnetic fields at a given instant in time. In this illustration, the electric field components are defined on the cell faces and the magnetic field components are defined on the cell edges. In accordance with the FDTD principle, the electric field is staggered both spatially and temporally from the magnetic field.

As with any explicit numerical modeling technique, which employs a grid structure for the computational domain, there exists a restriction on the time step $\Delta t$ with respect to the cell size to ensure stability. Within the FDTD scheme this is given by:

$$\Delta t \leq \left( v \sqrt{\frac{1}{(\Delta x)^2} + \frac{1}{(\Delta y)^2} + \frac{1}{(\Delta z)^2}} \right)^{-1}$$

where v is the speed of light in free space.

This stability condition, known as the Courant-Friedrichs-Lewy (CFL) condition, imposes a restriction on the size of the time step $\Delta t$ in relation to the cell dimensions of the grid.

In many instances, the object or environment to be modeled exhibits so-called inhomogeneities, such as complex or small-scale geometry, or curved boundaries. In order to accurately simulate and consider the effect of these inhomogeneities, the computational domain should preferably allow the numerical solution procedure to capture different levels of detail throughout the system. Analyzing electromagnetic fields using a grid which cannot adequately resolve intricate or small-scale structures leads to an inaccurate simulation which, in many applications, can have critical consequences. Obtaining a model of insufficient accuracy is particularly unacceptable in applications where human safety is being investigated, for example analyzing the effect of electromagnetic radiation from mobile communication devices on the human body. Furthermore, in complex multi-dimensional situations, for example when trying to simulate and forecast the electromagnetic dynamics for a complex object, such as a laptop computer, it is necessary to be able to resolve and precisely represent the electromagnetic interactions arising within the laptop at component level.

Thus, it is apparent that the grid dimensions ($\Delta x$, $\Delta y$, $\Delta z$) employed in any grid-based domain for simulation must be small enough to accurately represent the smallest feature in the model. Naturally, fine geometric features require fine grid cells for precise representation and thus, where a grid is employed throughout the domain in which $\Delta x = \Delta y = \Delta z$ for three dimensions, any spatial refinement needed to resolve small details leads to a global refinement of the computational grid dimensions. Similarly, the simulation of any wave phenomenon varying at a high frequency requires fine grid cells to represent accurately the propagation of the wave with time. If the object under consideration, or a part of it, is a small-scale or complex geometrical structure, such as a wire, it is clear that a fine grid is required accurately to model the field arising in the vicinity of the wire when an electric current is passed through the wire. Similarly, the errors that arise when modeling curved surfaces, due to the way in which they are 'staircased' to fit into the Cartesian grid, can be alleviated by employing a higher level of grid refinement.

Thus, to attain accuracy, fine grid cells are essential. An obvious consequence of the need to use fine grid cells in a uniform computational grid is an increase in the number of cells, and thus solution points, in the model. This in turn leads to a higher computing cost in terms of both memory and calculation time. In the example of FDTD schemes, the problem is further compounded by the CFL stability condition which bounds the time step $\Delta t$ in relation to the grid size so that the finer the grid cell, the smaller the time step $\Delta t$, thus further increasing the calculation workload. Software tools developed to analyze three-dimensional, highly intricate, high-frequency models therefore require substantial computing resources in the form of a large memory and high-processing-power central processing units to conduct a simulation that takes a considerable time to run.

Parallel processing, in which the grid is partitioned amongst the processing elements available for a collective computation to attain the solution, offers one means by which the calculation time of a numerical approximation can be reduced. However, this approach is often not cost effective, particularly in complex situations, since any advantage gained in the reduction of the calculation time may be countered by the considerable cost of adding the extra processing elements.

Rather than dividing the entire computational domain into a grid of fine cells, it is known to employ a coarse grid globally over the domain and then to apply one or more fine grids, each fine grid having a plurality of fine-grid cells in regions where they are needed. A domain comprising a coarse grid and having an embedded fine grid is shown in FIGS. 1A and 1B. This technique, known as subgridding, can therefore reduce the computational resource requirement by intelligently embedding fine grids locally in regions where they are needed within a coarse-grid model in order to resolve small-scale structures or to improve the modeling of curved boundaries. The savings in both memory and calculation time can be substantial, yet the technique substantially upholds the solution accuracy to that attained by a fine-grid model.

Despite the significant computational advantages that can be achieved by this technique, which circumvents the need to use a very small time step throughout the whole computational domain, subgridding methods are not commonly applied, at least in FDTD, primarily due to numerical instabilities arising at an interface between the coarse and fine grids in the form of late-time instability. This instability is still not yet fully understood and thus can not be predicted beforehand. This is a serious drawback of the subgridding method. The numerical instability arises as a consequence of the discontinuity in the number of solution points at the interface between the coarse grid and the fine grid. In particular, errors are introduced by the temporal and spatial interpolation required to convey information at the interface between the two grids.

SUMMARY

The invention has recognized that there is an opportunity to improve the stability of subgridding methods.

According to a first aspect, there is provided a method for assessing wave propagation arising in a physical system by obtaining a numerical approximation of the physical system to be simulated, the method comprising defining a computational domain comprising a first grid having a plurality of first-grid cells and a first-grid time step, a second grid being a refinement of the first grid and having a plurality of second-grid cells and a second-grid time step, and an intermediate grid having a plurality of intermediate-grid cells of equal size to the first-grid cells and having the second-grid time step, wherein each cell has one or more solution points at which values representing a physical quantity of the physical system to be simulated may be obtained;

performing a first update procedure to obtain values representing the physical quantity after a said first-grid time step, the values being obtained for at least one solution point of at least one first-grid cell;

performing a coupling procedure using values from the first grid to obtain values at a perimeter of the second grid; and performing a second update procedure, using the values at the perimeter of the second grid, to obtain values representing the physical quantity after a said second-grid time step, the values being obtained for at least one solution point of at least one second-grid cell;

wherein the coupling procedure comprises performing temporal coupling by using values from the first grid to obtain values at a perimeter of the intermediate grid;

performing an intermediate update procedure to obtain values representing the physical quantity after the said second-grid time step of the second update procedure, the values being obtained for at least one solution point of at least one intermediate-grid cell; and performing spatial coupling by using values from the intermediate grid to obtain the values at the perimeter of the second grid used in the second update procedure;

wherein defining the computational domain comprises defining the perimeter of the intermediate grid to be wider than the perimeter of the second grid on at least one side of the second grid by a distance equal to at least two times the size of one of the first-grid cells in that dimension.

In this way, the stability of multigrid schemes may be improved. Results of numerical experiments are presented later to illustrate the improvement.

The temporal coupling may comprise obtaining the values at the perimeter of the intermediate grid by temporal interpolation using values at locations in the first grid which correspond to the locations of the values at the perimeter of the intermediate grid, the interpolated values representing the physical quantity of the physical system after the said second-grid time step of the second update procedure.

The spatial coupling may comprise obtaining the values at the perimeter of the second grid by spatial interpolation using values from the intermediate grid.

Defining the computational domain may comprise defining each of the first, second and intermediate grids to be one dimensional, and defining the perimeter of the intermediate grid to be wider than the perimeter of the second grid on at least one side of the second grid by a distance equal to at least three times the size of one of the first-grid cells in the one dimension.

Defining the computational domain may comprise defining each of the first, second and intermediate grids to be at least two dimensional, and defining the perimeter of the intermediate grid to be wider than the perimeter of the second grid on at least one side of the second grid by a distance equal to at least two times the size of one of the first-grid cells in that dimension.

The method may comprise using values from the second grid to update values in the first grid, thereby improving the accuracy of the first grid.

The physical system may comprise two physical quantities which are derivable from one another. The method may comprise performing the temporal coupling using one of the two physical quantities and performing the spatial coupling using the other of the two physical quantities.

One physical quantity may be one of electric field strength and magnetic field strength and the other physical quantity may be the other of electric field strength and magnetic field strength.

The method may comprise defining the perimeter of the intermediate grid to be wider than the perimeter of the second grid by the specified distance on all sides of the second grid, except where the perimeter of the second grid is within the specified distance of a boundary of the computational domain.

According to a second aspect, there is provided an apparatus for assessing wave propagation arising in a physical system by obtaining a numerical approximation of the physical system to be simulated, the apparatus comprising
  domain circuitry configured to define a computational domain comprising a first grid having a plurality of first-grid cells and a first-grid time step, a second grid being a refinement of the first grid and having a plurality of second-grid cells and a second-grid time step, and an intermediate grid having a plurality of intermediate-grid cells of equal size to the first-grid cells and having the second-grid time step, wherein each cell has one or more solution points at which values representing a physical quantity of the physical system to be simulated may be obtained;
  first update circuitry configured to perform a first update procedure to obtain values representing the physical quantity after a said first-grid time step, the values being obtained for at least one solution point of at least one first-grid cell;
  coupling circuitry configured to perform a coupling procedure using values from the first grid to obtain values at a perimeter of the second grid; and
  second update circuitry configured to perform a second update procedure, using the values at the perimeter of the second grid, to obtain values representing the physical quantity after a said second-grid time step, the values being obtained for at least one solution point of at least one second-grid cell;
  wherein the coupling circuitry comprises
    temporal coupling circuitry configured to perform temporal coupling by using values from the first grid to obtain values at a perimeter of the intermediate grid;
    intermediate update circuitry configured to perform an intermediate update procedure to obtain values representing the physical quantity after the said second-grid time step of the second update procedure, the values being obtained for at least one solution point of at least one intermediate-grid cell; and
    spatial coupling circuitry configured to perform spatial coupling by using values from the intermediate grid to obtain the values at the perimeter of the second grid used in the second update procedure;
  wherein the domain circuitry is configured to define the perimeter of the intermediate grid to be wider than the perimeter of the second grid on at least one side of the second grid by a distance being equal to at least two times the size of one of the first-grid cells in that dimension.

The temporal coupling circuitry may be configured to perform the temporal coupling to obtain the values at the perimeter of the intermediate grid by temporal interpolation using values at locations in the first grid which correspond to the locations of the values at the perimeter of the intermediate grid, the interpolated values representing the physical quantity of the physical system after the said second-grid time step of the second update procedure.

The spatial coupling circuitry may be configured to perform the spatial coupling to obtain the values at the perimeter of the second grid by spatial interpolation using values from the intermediate grid.

The domain circuitry may be configured to define each of the first, second and intermediate grids to be one dimensional, and to define the perimeter of the intermediate grid to be wider than the perimeter of the second grid on at least one side of the second grid by a distance equal to at least three times the size of one of the first-grid cells in the one dimension.

The domain circuitry may be configured to define each of the first, second and intermediate grids to be at least two dimensional, and to define the perimeter of the intermediate grid to be wider than the perimeter of the second grid on at least one side of the second grid by a distance equal to at least two times the size of one of the first-grid cells in that dimension.

The apparatus may comprise feedback circuitry configured to use values from the second grid to update values in the first grid, thereby improving the accuracy of the first grid.

The physical system may comprise two physical quantities which are derivable from one another. The temporal coupling circuitry may be configured to perform the temporal coupling using one of the two physical quantities and the spatial coupling circuitry may be configured to perform the spatial coupling using the other of the two physical quantities.

The domain circuitry may be configured to define the perimeter of the intermediate grid to be wider than the perimeter of the second grid by the specified distance on all sides of the second grid, except where the perimeter of the second grid is within the specified distance of a boundary of the computational domain.

According to a third aspect, there is provided a computer program which, when run on computer, causes the computer to perform the method of the first aspect.

According to a fourth aspect, there is provided a computer program which, when loaded into a computer, causes the computer to become the apparatus of the second aspect.

According to a fifth aspect, there is provided a computer program of the third or fourth aspect, carried by a carrier medium.

According to a sixth aspect, there is provided a computer program of the fifth aspect, wherein said carrier medium is a recording medium.

According to a seventh aspect, there is provided a computer program of the fifth aspect, wherein said carrier medium is a transmission medium.

According to an eighth aspect, there is provided a computer program for assessing wave propagation arising in a physical system by obtaining a numerical approximation of the physical system to be simulated, which, when run on a computer, causes the computer to perform a method comprising
  defining a computational domain comprising a first grid having a plurality of first-grid cells and a first-grid time step, a second grid being a refinement of the first grid and having a plurality of second-grid cells and a second-grid time step, and an intermediate grid having a plurality of intermediate-grid cells of equal size to the first-grid cells and having the second-grid time step, wherein each cell has one or more solution points at which values representing a physical quantity of the physical system to be simulated may be obtained;

performing a first update procedure to obtain values representing the physical quantity after a said first-grid time step, the values being obtained for at least one solution point of at least one first-grid cell;

performing a coupling procedure using values from the first grid to obtain values at a perimeter of the second grid; and performing a second update procedure, using the values at the perimeter of the second grid, to obtain values representing the physical quantity after a said second-grid time step, the values being obtained for at least one solution point of at least one second-grid cell;

wherein the coupling procedure comprises performing temporal coupling by using values from the first grid to obtain values at a perimeter of the intermediate grid;

performing an intermediate update procedure to obtain values representing the physical quantity after the said second-grid time step of the second update procedure, the values being obtained for at least one solution point of at least one intermediate-grid cell; and performing spatial coupling by using values from the intermediate grid to obtain the values at the perimeter of the second grid used in the second update procedure;

wherein defining the computational domain comprises defining the perimeter of the intermediate grid to be wider than the perimeter of the second grid on at least one side of the second grid by a distance equal to at least two times the size of one of the first-grid cells in that dimension.

By "that dimension" may be meant any dimension of the computational domain in which the perimeters of the second and intermediate grids are separated.

In any aspect, the perimeter of the intermediate grid may be wider than the perimeter of the second grid on at least one side of the second grid by a distance equal to at least two times the size of one of the first grid cells. By "size" there may be meant a width, length or height as appropriate.

In any aspect, the perimeter of the intermediate grid may be wider than the perimeter of the second grid in any given dimension by a distance equal to at least two times the size of one of the first grid cells in that dimension.

It should be appreciated that domains having several levels of refinement are envisaged in which a fine grid having a higher level of refinement may be embedded within a fine grid having a lower level of refinement. For example, a primary-level fine grid may have at least one secondary-level fine grid embedded within one or more of the primary-level fine-grid cells. Thus, in situations where significant refinement of the coarse grid is needed in order to resolve a particular feature or source of inhomogeneity, the required level of refinement can be achieved in a series of refinement stages. In this way, the discontinuity between the coarse grid and the ultimate grid of the required refinement level is more gradually introduced bringing a greater level of stability to the calculation procedure.

The computational domain may be created by means of a computer program run on a computer. Input data representing the system geometry and material properties may be entered by a user. Furthermore, the update procedure(s) may be carried out by means of a computer program installed and run on a computer.

The above aspects may be employed for the numerical approximation of an electromagnetic field based on a FDTD (Finite-Difference Time-Domain) method. In this method, each cell holds an arrangement of solution points for the electromagnetic field in which the solution points for the electric field ($\vec{E}$) are staggered orthogonally with respect to the solution points of the magnetic field ($\vec{H}$). The update procedure may be performed to obtain solutions for the electric and magnetic fields using the FDTD updating equations which define a new value of a first-field component (where the first-field component is one of E or H) at a given instant in time and point in space in relation to a gradient term of a second-field component (where the second field component is the other of E and H) at the given point in space of the first-field component. The gradient term can be approximated by the difference between the value of the second-field component on one side of the given point in space of the first-field component and the value of the second-field component on an opposite side of the given point in space of the first-field component.

During the update procedures performed in order to update the solution for a field at a given instant in time, the whole of the coarsest grid may be updated even in regions where one or more finer grids exist. This is due to the explicit nature of the FDTD scheme which depends upon values being obtainable at all points in a rectangular grid of a particular refinement level in order to fully complete the update for that grid and thus to approximate electromagnetic propagation through the whole domain. If, for example, solutions for the coarsest grid were discontinued in regions where a fine grid existed, there would effectively be a "hole" in the coarsest grid. It may not then be possible to update the coarsest grid at solution points in the vicinity of the finer grid since required values of the coarsest grid in that vicinity would be missing.

The computational domain may comprise a Cartesian-type grid.

During the update procedure(s), solutions may be determined at the perimeter of a grid by means of spatial and temporal interpolation.

The second grid may be positioned within the computational domain so as to map inhomogeneities arising in the physical system to be stimulated.

Any one or more of the first, second and intermediate grids may be non-regular in shape.

The computational domain may be created by means of a computer program run on a computer.

The update procedure may be performed by means of a computer program run on a computer.

According to a ninth aspect, there is provided a method for assessing wave propagation arising in a physical system by obtaining a numerical approximation of the physical system to be simulated, the method comprising defining a computational domain comprising a first grid having a plurality of first-grid cells and a second grid being a refinement of the first grid and having a plurality of second-grid cells, wherein each cell has one or more solution points at which values representing a physical quantity of the physical system to be simulated may be obtained;

performing a coupling procedure using values from the first grid to obtain values at a perimeter of the second grid, wherein the coupling procedure comprises performing temporal coupling and spatial coupling, wherein a location at which the temporal coupling is performed is separated from a location at which the spatial coupling is performed on at least one side of the second grid by a distance equal to at least two times the size of one of the first-grid cells in that dimension.

The method may include, optionally before the coupling procedure, performing a first update procedure to obtain values representing the physical quantity after a first-grid time step, the values being obtained for at least one solution point of at least one first-grid cell;

The method may include, optionally after the coupling procedure, performing a second update procedure, using values at the perimeter of the second grid, to obtain values representing the physical quantity after a second-grid time step, the values being obtained for at least one solution point of at least one second-grid cell;

According to a tenth aspect, there is provided an apparatus for assessing wave propagation arising in a physical system by obtaining a numerical approximation of the physical system to be simulated, the apparatus comprising domain circuitry configured to define a computational domain comprising a first grid having a plurality of first-grid cells and a second grid being a refinement of the first grid and having a plurality of second-grid cells, wherein each cell has one or more solution points at which values representing a physical quantity of the physical system to be simulated may be obtained;

coupling circuitry configured to perform a coupling procedure using values from the first grid to obtain values at a perimeter of the second grid; and wherein the coupling circuitry comprises temporal coupling circuitry configured to perform temporal coupling and spatial coupling circuitry configured to performing spatial coupling, wherein the temporal coupling circuitry and the spatial coupling circuitry are configured to perform the temporal coupling and the spatial coupling at locations which are separated on at least one side of the second grid by a distance equal to at least two times the size of one of the first-grid cells in that dimension.

The apparatus may include first update circuitry configured to perform a first update procedure to obtain values representing the physical quantity after a first-grid time step, the values being obtained for at least one solution point of at least one first-grid cell.

The apparatus may include second update circuitry configured to perform a second update procedure, using values at the perimeter of the second grid, to obtain values representing the physical quantity after a second-grid time step, the values being obtained for at least one solution point of at least one second-grid cell.

The method and apparatus of the ninth and tenth aspects respectively may include any features of earlier aspects.

Embodiments of the present invention may find particular use in numerical approximation methods which employ a domain comprising a structured Cartesian grid.

The invention includes one or more aspects, embodiments or features in isolation or in various combinations whether or not specifically stated (including claimed) in that combination or in isolation.

The above summary is intended to be merely exemplary and non-limiting.

BRIEF DESCRIPTION OF THE DRAWINGS

For a better understanding of the present invention, and to show how the same may be carried into effect, reference will now be made, by way of example, to the accompanying drawings in which.

DETAILED DESCRIPTION

Figure 1A:
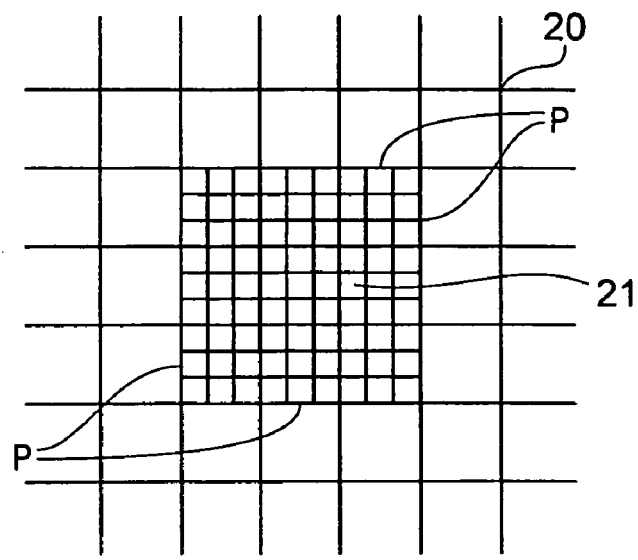
FIGS. 1A and 1B show the application of an embedded fine-grid to a computational domain illustrated in two and three dimensions respectively.
Figure 1B:
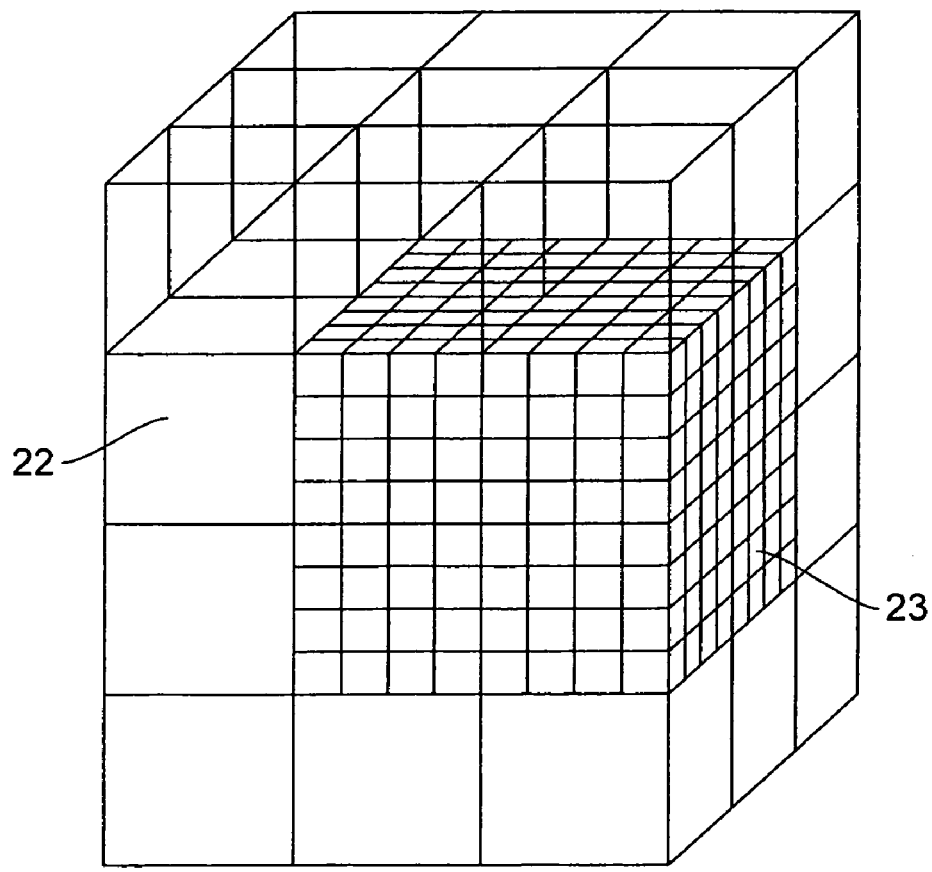

FIG. 1A shows, in two dimensions, part of a computational domain comprising a coarse-grid 20 and having a fine-grid 21 embedded therein. The perimeter P of the fine-grid 21, which is embedded within an area of nine coarse-grid cells, forms the interface between the coarse-grid and the fine-grid. FIG. 1B shows, in three dimensions, part of a computational domain comprising a coarse-grid 22 and a fine-grid 23 embedded therein.

Figure 2A:
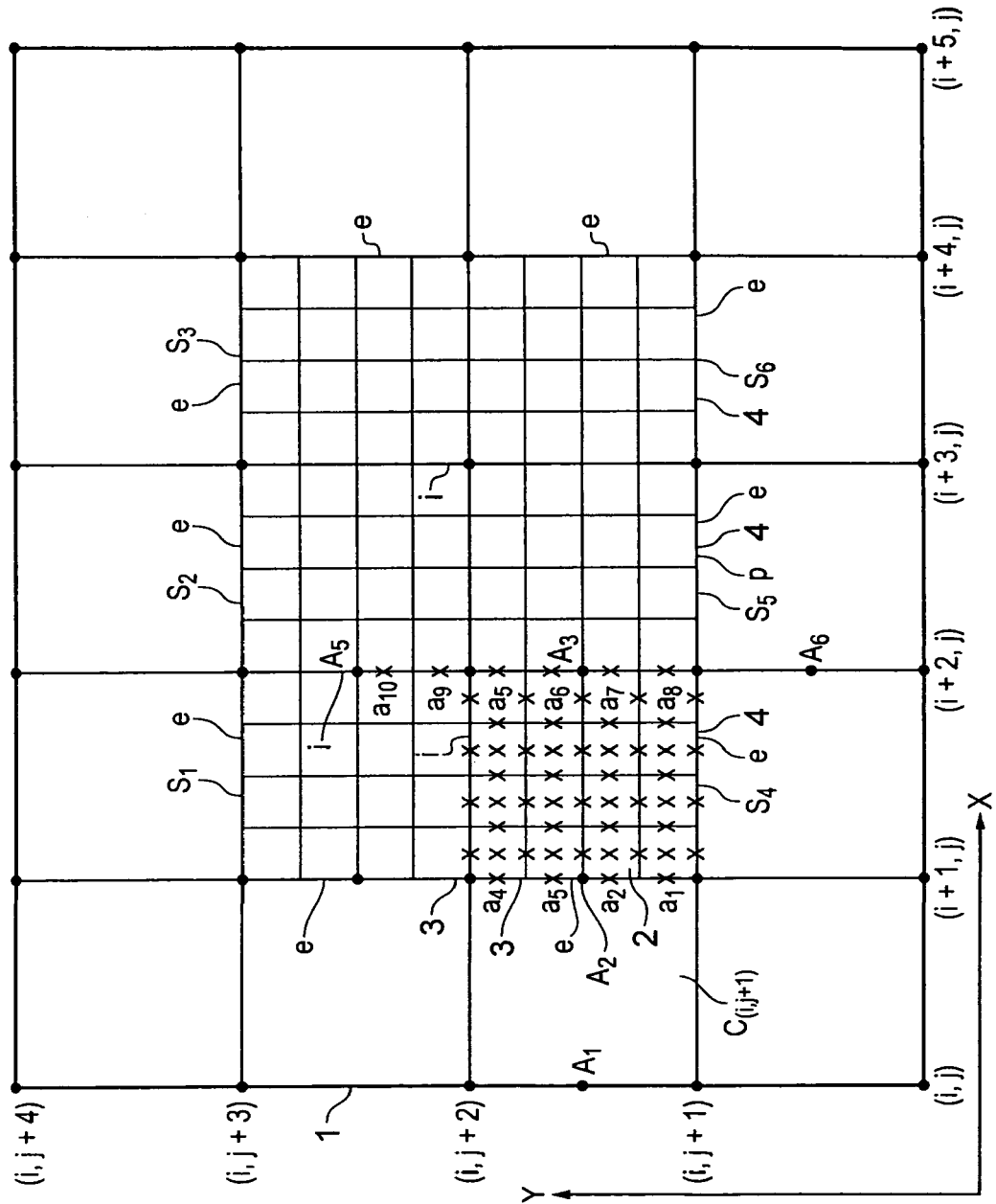
FIG. 2A shows a two-dimensional Cartesian-grid domain and FIG. 2B shows, to a larger scale, part of the domain of FIG. 2A.

FIG. 2A shows a two-dimensional domain comprising a coarse-grid 1 having a fine-grid region 2 of refinement integer k=4, the fine-grid region being comprised of six neighbouring fine-grids $S_1$ to $S_6$, each fine-grid being embedded within a single coarse-grid cells. P defines the perimeter of the fine-grid region and is comprised of the external interfaces e between the coarse-grid and fine-grid region. A common interface i exists at each point within the fine-grid region 2 where the edge or face of the cells of the primary level region coincide with the edge of face of the cells of the coarse-grid region. Each grid point may be represented by a pair of integers (i, j), where i and j are grid coordinate numbers in the x-axis and y-axis directions respectively. Each of the cells comprises a number of solution points for the numerical approximation which are solved at a given instant in time. Thus, the picture simulated from the mathematical solutions on the grid is representative of the physical system being simulated at a given instant in time n. In this illustration, solution points are provided at each of the cell edges and cell faces as depicted for fine-grid $S_4$.

In order to update the values at each of the solution points an explicit time-marching update procedure is carried out in which solutions are obtained at a given instant in time with reference to values at the previous instant in time. Solutions are firstly obtained in this way for the coarse-grid.

In a previously-considered method, in order to update the solution points of the each of fine-grids, the fine grid values at each common interface within the fine-grid region 2 would have been obtained from the coarse-grid solution at that common interface by means of spatial and temporal interpolation. Thus, in order to obtain values $a_5$, $a_6$, $a_9$ and $a_{10}$, interpolation may be conducted using $A_3$ and $A_5$. Standard linear interpolation functions may be used for both the temporal and spatial interpolation. In particular, the temporal interpolation function may be given by: $T(A^n, A^{n+1}, j) = A^n + j(A^{n+1} - A^n)$ where j is the missing fine-grid temporal values. For example, in FIG. 2A, missing temporal value n+¼ at location $A_3$ is given by: $a^{n+1/4} = T(A_3{}^n, A_3{}^{n+1}, \frac{1}{4})$. Furthermore, the spatial interpolation function may be given by: $S(A_i, A_j, d) = A_i + d(A_j - A_i)$ where i and j are the coordinates for the coarse-grid location of value A and d is the normalized distance away from i along the i to j path. For example, in FIG. 2A, the missing spatial value for $a_5$ is $a_5 = S(A_3, A_5, d_5)$.

Figure 2B:
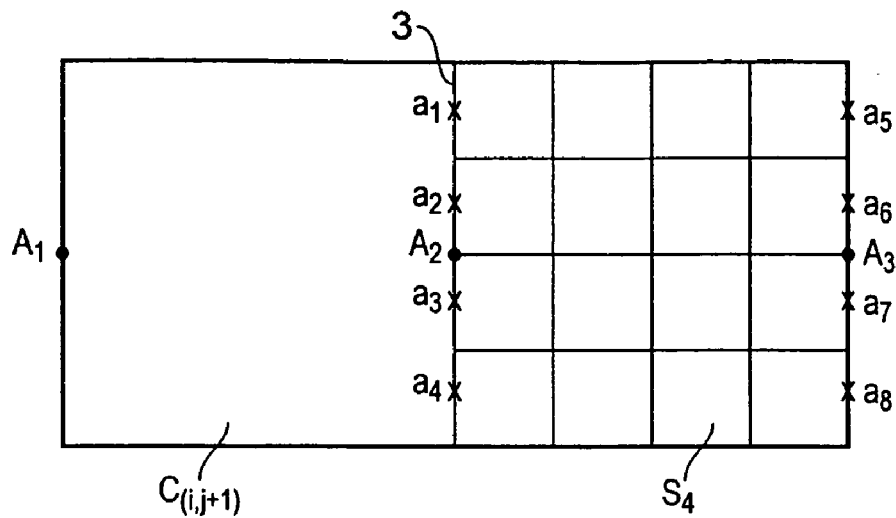

FIG. 2B shows an enlarged version of coarse-cell $C_{(i,j+1)}$ and fine-grid $S_4$ shown in FIG. 2A in order to illustrate the previously-considered interpolation procedure required to obtain values at the initial boundary of the fine-grid region. Solutions are obtained for the coarse grid solution points $A_1$ and $A_2$ using the appropriate numerical updating stencils for the simulation. In order to commence the update for the fine-grid solution points, spatial values are required at solution points $a_1$ to $a_4$ which must be obtained from spatial and temporal interpolation between the co-located coarse-grid point $A_2$ and at least one other coarse-grid value. Standard linear interpolation functions such as those discussed above are sufficient for use in obtaining the fine-grid solutions at solution points $a_1$ to $a_4$. Thus, missing temporal value n+¼ at location $A_2$ is given by: $a^{n+1/4} = T(A_2{}^n, A_2{}^{n+1}, \frac{1}{4})$. Furthermore, the spatial interpolation function may be given by: $S(A_i, A_j, d) = A_i + d(A_j - A_i)$ where i and j are the coordinates for the coarse-grid location of value A and d is the normalized distance away from i along the i to j path.

Figure 3:
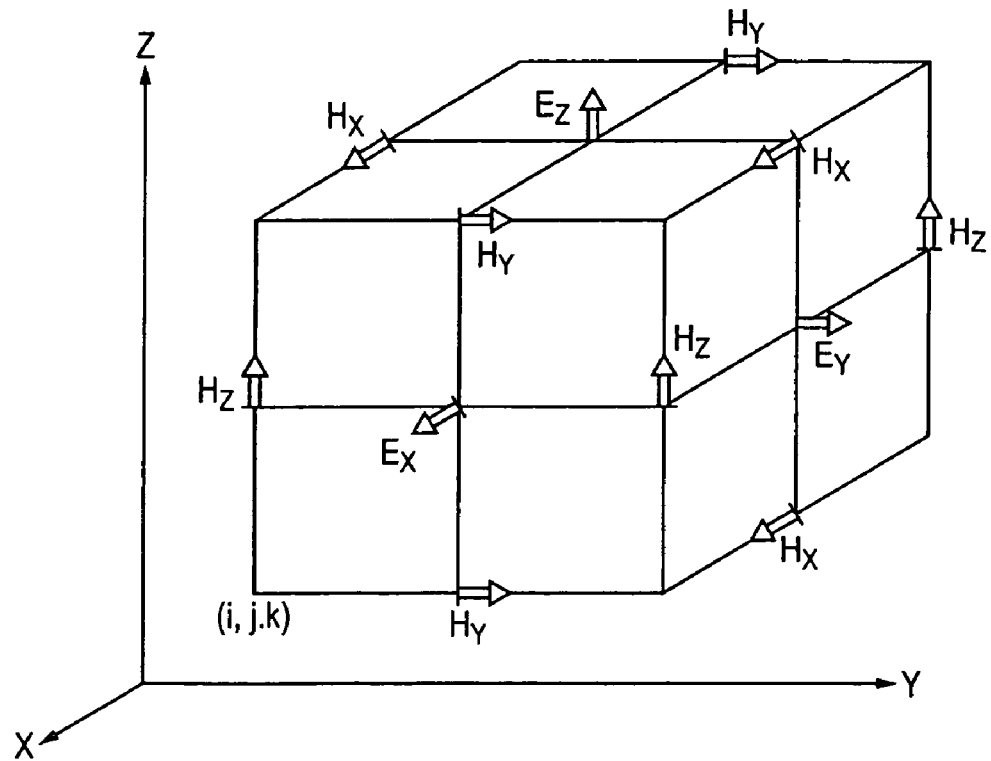
FIG. 3 shows a three-dimensional cell employed in a FDTD (Finite-Difference Time-Domain) scheme.
Figure 4:
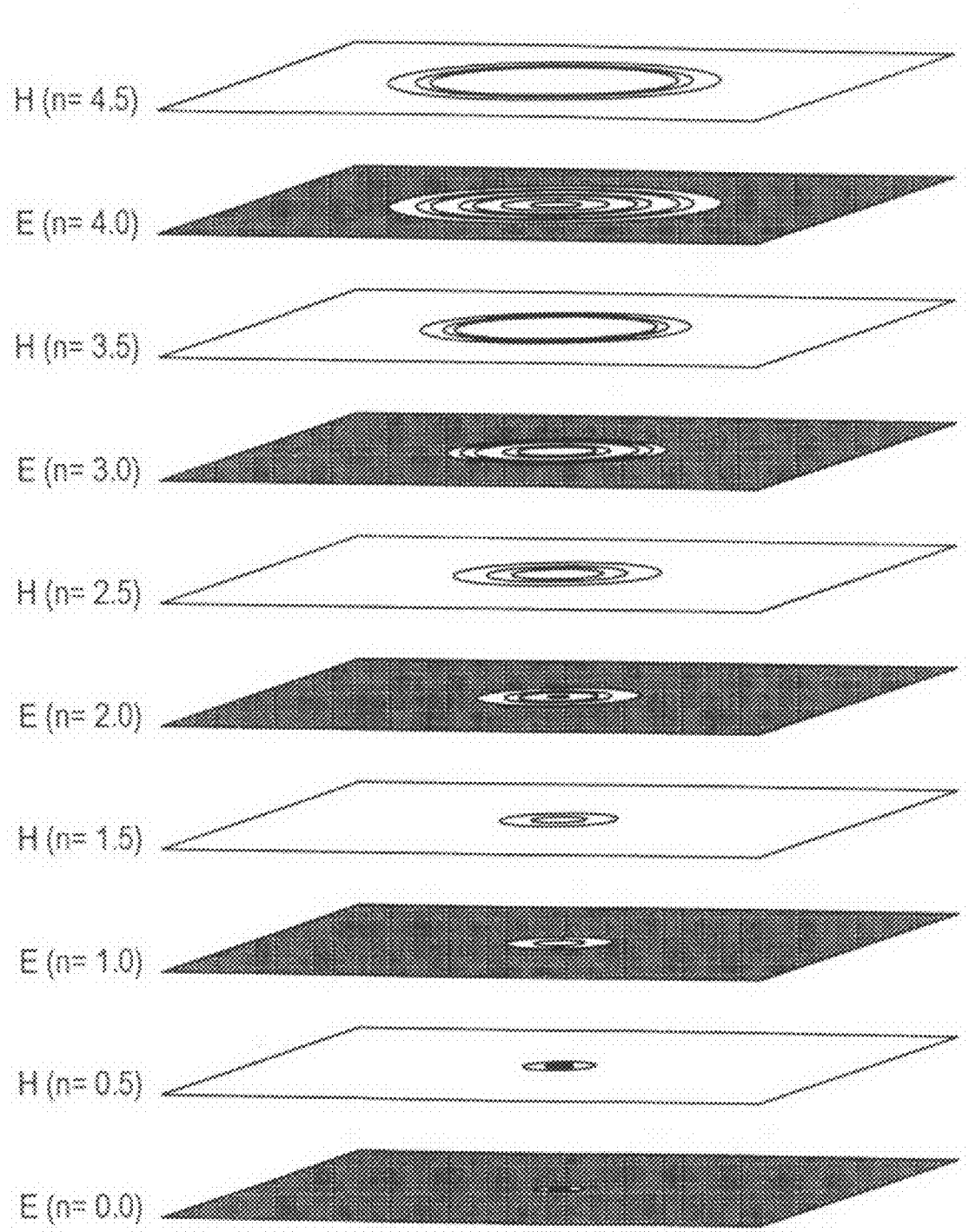
FIG. 4 illustrates a simulated electromagnetic wave propagating from a central source point.

A specific example of an FDTD scheme which utilizes a structured grid will now be given with reference to FIG. 3. FIG. 3 shows a three-dimensional cell wherein each point of the cell being is represented by integers (i, j, k), where i, j and k are grid coordinate numbers in the x-axis, y-axis and z-axis directions respectively. Each of the cells comprises a number of solution points or nodes for the electric and magnetic fields at a given instant in time. In this illustration, the electric field components are defined on the cell faces and the magnetic field components are defined on the cell edges. In accordance with the FDTD principle, the electric field solution points are staggered both spatially and temporally from the magnetic field solution points. This means that no solution is obtained for both the electric and magnetic field at the same instant in time or the same position in space. Rather, the electric field is solved at a given instant in time, say n=0, 1, 2 . . . and the magnetic field is solved at the next instant in time, say n=0.5,
1.5, 2.5 . . . . This is illustrated pictorially in FIG. 4 which shows a simple electromagnetic wave propagating from a central source point where the initial field conditions are zero at all points in space.

The following background theory relating to the FDTD scheme for simulating electromagnetic radiation is considered useful to aid the understanding of the present invention.

Any electromagnetic field is fully described by the Maxwell equations:

$$\nabla \cdot \vec{E} = 0 \qquad (1)$$

$$\nabla \cdot \vec{H} = 0 \qquad (2)$$

$$\mu \frac{\partial \vec{H}}{\partial t} = \nabla \times \vec{E} \qquad (3)$$

$$\varepsilon \frac{\partial \vec{E}}{\partial t} + \sigma \vec{E} = \nabla \times \vec{H} \qquad (4)$$

Where E=(Ex, Ey, Ez) is the electric field (V/m), H=(Hx, Hy, Hz) is the magnetic field (A/m), ε is the magnetic permittivity (F/m), μ is the magnetic permeability (H/m) and σ is the electric conductivity (S/m).

Writing equations (3) and (4) in component form gives:

$$\mu \frac{\partial H_x}{\partial t} = \frac{\partial E_y}{\partial z} - \frac{\partial E_z}{\partial y} \qquad (5)$$

$$\mu \frac{\partial H_y}{\partial t} = \frac{\partial E_z}{\partial x} - \frac{\partial E_x}{\partial z} \qquad (6)$$

$$\mu \frac{\partial H_z}{\partial t} = \frac{\partial E_x}{\partial y} - \frac{\partial E_y}{\partial x} \qquad (7)$$

$$\varepsilon \frac{\partial E_x}{\partial t} + \sigma E_x = \frac{\partial H_z}{\partial y} - \frac{\partial H_y}{\partial z} \qquad (8)$$

$$\varepsilon \frac{\partial E_y}{\partial t} + \sigma E_y = \frac{\partial H_x}{\partial z} - \frac{\partial H_z}{\partial x} \qquad (9)$$

$$\varepsilon \frac{\partial E_z}{\partial t} + \sigma E_z = \frac{\partial H_y}{\partial x} - \frac{\partial H_x}{\partial y} \qquad (10)$$

It can be seen from equation (3) that the time derivative of the H field is dependent on the Curl of the E field (i.e. the change in the E field across space). Similarly from equation (4), the time derivative of the E field is dependent on the change in the H field across space. This leads us to the basic FDTD expression that the new value of the E-field $E^{N+1}$ at a given point in space is dependent on i) the old value of the E-field $E^N$ at the same point in space and ii) the difference between the old value of the H-field, $H^{N+1/2}$, on one side of the E-field point in space and the value of $H^{N+1/2}$ on another side of the E-field point in space. Similarly, the new value of the H-field is dependent on the old value of the H-field and the difference between the old values for the E-field on either side of the H-field point. Thus, approximating the spatial derivatives of equations (5) to (10) gives the following FDTD central-difference updating stencils for the electromagnetic field:

$$H_x^{n+\frac{1}{2}}\left(i, j+\frac{1}{2}, k+\frac{1}{2}\right) = H_x^{n-\frac{1}{2}}\left(i, j+\frac{1}{2}, k+\frac{1}{2}\right) + D_b\left(i, j+\frac{1}{2}, k+\frac{1}{2}\right) \quad (11)$$

$$\left[\left\{E_y^n\left(i, j+\frac{1}{2}, k+1\right) - E_y^n\left(i, j+\frac{1}{2}, k\right)\right\}/\Delta z(k) - \right.$$
$$\left.\left\{E_z^n\left(i, j+1, k+\frac{1}{2}\right) - E_z^n\left(i, j, k+\frac{1}{2}\right)\right\}/\Delta y(j)\right]$$

$$H_y^{n+\frac{1}{2}}\left(i, +\frac{1}{2}, j, k+\frac{1}{2}\right) = \quad (12)$$
$$H_y^{n-\frac{1}{2}}\left(i+\frac{1}{2}, j, k+\frac{1}{2}\right) + D_b\left(i+\frac{1}{2}, j, k+\frac{1}{2}\right)$$
$$\left[\left\{E_z^n\left(i+1, j, k+\frac{1}{2}\right) - E_z^n\left(i, j, k+\frac{1}{2}\right)\right\}/\Delta x(i) - \right.$$
$$\left.\left\{E_x^n\left(i+\frac{1}{2}, j, k+1\right) - E_x^n\left(i+\frac{1}{2}, j, k\right)\right\}/\Delta z(k)\right]$$

$$H_z^{n+\frac{1}{2}}\left(i+\frac{1}{2}, j+\frac{1}{2}, k\right) = H_z^{n-\frac{1}{2}}\left(i+\frac{1}{2}, j+\frac{1}{2}, k\right) + D_b\left(i+\frac{1}{2}, j+\frac{1}{2}, k\right) \quad (13)$$
$$\left[\left\{E_x^n\left(i+\frac{1}{2}, j+1, k\right) - E_x^n\left(i+\frac{1}{2}, j, k\right)\right\}/\Delta y(j) - \right.$$
$$\left.\left\{E_y^n\left(i+1, j+\frac{1}{2}, k\right) - E_y^n\left(i, j+\frac{1}{2}, k\right)\right\}/\Delta x(i)\right]$$

$$E_x^{n+1}\left(i+\frac{1}{2}, j, k\right) = C_a\left(i+\frac{1}{2}, j, k\right) \cdot E_x^n\left(i+\frac{1}{2}, j, k\right) + C_b\left(i+\frac{1}{2}, j, k\right) \quad (14)$$
$$\left[\left\{H_z^{n+\frac{1}{2}}\left(i+\frac{1}{2}, j+\frac{1}{2}, k\right) - H_z^{n+\frac{1}{2}}\left(i+\frac{1}{2}, j-\frac{1}{2}, k\right)\right\}/\Delta y(j) - \right.$$
$$\left.\left\{H_y^{n+\frac{1}{2}}\left(i+\frac{1}{2}, j, k+\frac{1}{2}\right) - H_y^{n+\frac{1}{2}}\left(i+\frac{1}{2}, j, k-\frac{1}{2}\right)\right\}/\Delta z(k)\right]$$

$$E_y^{n+1}\left(i, j+\frac{1}{2}, k\right) = C_a\left(i, j+\frac{1}{2}, k\right) \cdot E_y^n\left(i, j+\frac{1}{2}, k\right) + C_b\left(i, j+\frac{1}{2}, k\right) \quad (15)$$
$$\left[\left\{H_x^{n+\frac{1}{2}}\left(i, j+\frac{1}{2}, k+\frac{1}{2}\right) - H_x^{n+\frac{1}{2}}\left(i, j+\frac{1}{2}, k-\frac{1}{2}\right)\right\}/\Delta z(k) - \right.$$
$$\left.\left\{H_z^{n+\frac{1}{2}}\left(i+\frac{1}{2}, j+\frac{1}{2}, k\right) - H_z^{n+\frac{1}{2}}\left(i-\frac{1}{2}, j+\frac{1}{2}, k\right)\right\}/\Delta x(i)\right]$$

$$E_z^{n+1}\left(i, j, k+\frac{1}{2}\right) = C_a\left(i, j, k+\frac{1}{2}\right) \cdot E_z^n\left(i, j, k+\frac{1}{2}\right) + C_b\left(i, j, k+\frac{1}{2}\right) \quad (16)$$
$$\left[\left\{H_y^{n+\frac{1}{2}}\left(i+\frac{1}{2}, j, k+\frac{1}{2}\right) - H_y^{n+\frac{1}{2}}\left(i-\frac{1}{2}, j, k+\frac{1}{2}\right)\right\}/\Delta x(i) - \right.$$
$$\left.\left\{H_x^{n+\frac{1}{2}}\left(i, j+\frac{1}{2}, k+\frac{1}{2}\right) - H_x^{n+\frac{1}{2}}\left(i, j-\frac{1}{2}, k+\frac{1}{2}\right)\right\}/\right.$$
$$\Delta y(j)]$$

Where $$D_b(i, j, k) = \frac{\Delta t}{\mu(i, j, k)}$$

$$C_a(i, j, k) = \frac{2\varepsilon(i, j, k) - \sigma(i, j, k)\Delta t}{2\varepsilon(i, j, k) + \sigma(i, j, k)\Delta t}$$

$$C_b(i, j, k) = \frac{2\Delta t}{2\varepsilon(i, j, k) + \sigma(i, j, k)\Delta t}$$

During the computational simulation, equations (11) to (16) are solved in a leap-frog manner to incrementally advance the E and H fields forward in time by a time step $\Delta t$.

Examples of the procedures involved in performing a simulation will now be discussed with reference to the specific example of simulating an electromagnetic field using the FDTD scheme.

The domain in which the simulation is to be performed is normally created by means of a computer program implemented on a computer. The geometry of the system to be simulated must be specified pre-processing by a user, together with details of the initial field conditions (which may be zero), a function representing at least one source of electromagnetic radiation and the material properties (e.g. the magnetic permittivity $\epsilon$, the magnetic permeability $\mu$, and the electric conductivity $\sigma$ may be defined). Furthermore, in order to produce an accurate solution to Maxwell's equations, the results should represent a solution over an infinite space. However, practical limitations of computer power and memory require the termination of the computational grid. Any such termination method must not affect the computations inside the finite computational grid. Thus, boundary conditions to this effect are imposed on the computational domain boundaries before the simulation is performed. Due to the explicitness of the FDTD method, Dirichlet (fixed value) interface boundary conditions are the most appropriate for the embedded fine grid boundary.

In that case that fine-grid regions, possibly of varying refinement levels, are positioned within the domain so as to map the geometrical outline of, for example, small-scale structures or curved boundaries, a user may specify the position, refinement level and boundary perimeter of each fine-grid region, together with its connectivity to other fine-grid regions within the domain.

Figure 5A:
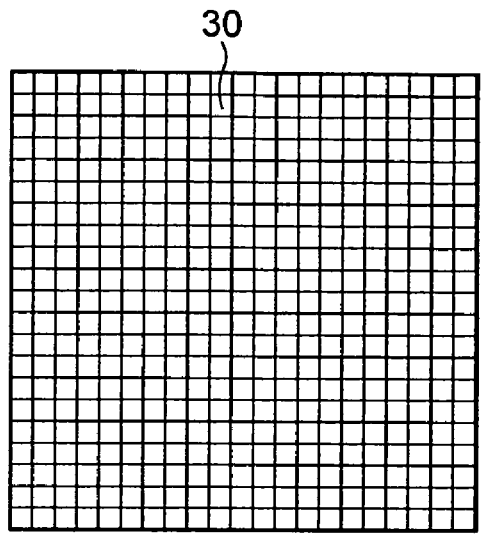
FIGS. 5A to 5C show a uniform FDTD scheme, a non-uniform FDTD scheme and a multigrid FDTD scheme.
Figure 5B:
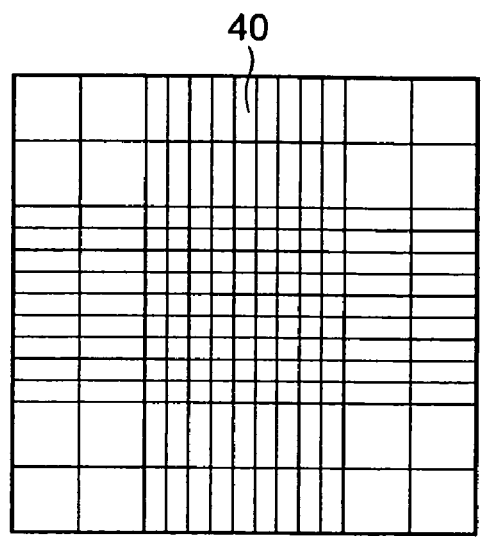
Figure 5C:
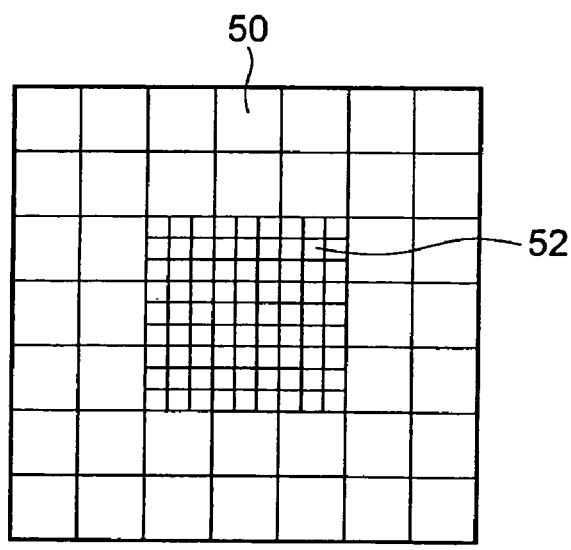

FIGS. 5A to 5C show a uniform FDTD scheme including a uniform grid 30, a non-uniform FDTD scheme including a non-uniform grid 40, and a multigrid FDTD scheme including a coarse grid 50 and an embedded grid 52.

The invention may be used to address late-time instability in a multigrid FDTD scheme, and/or to increase the stability of the multigrid FDTD scheme.

Figure 6:
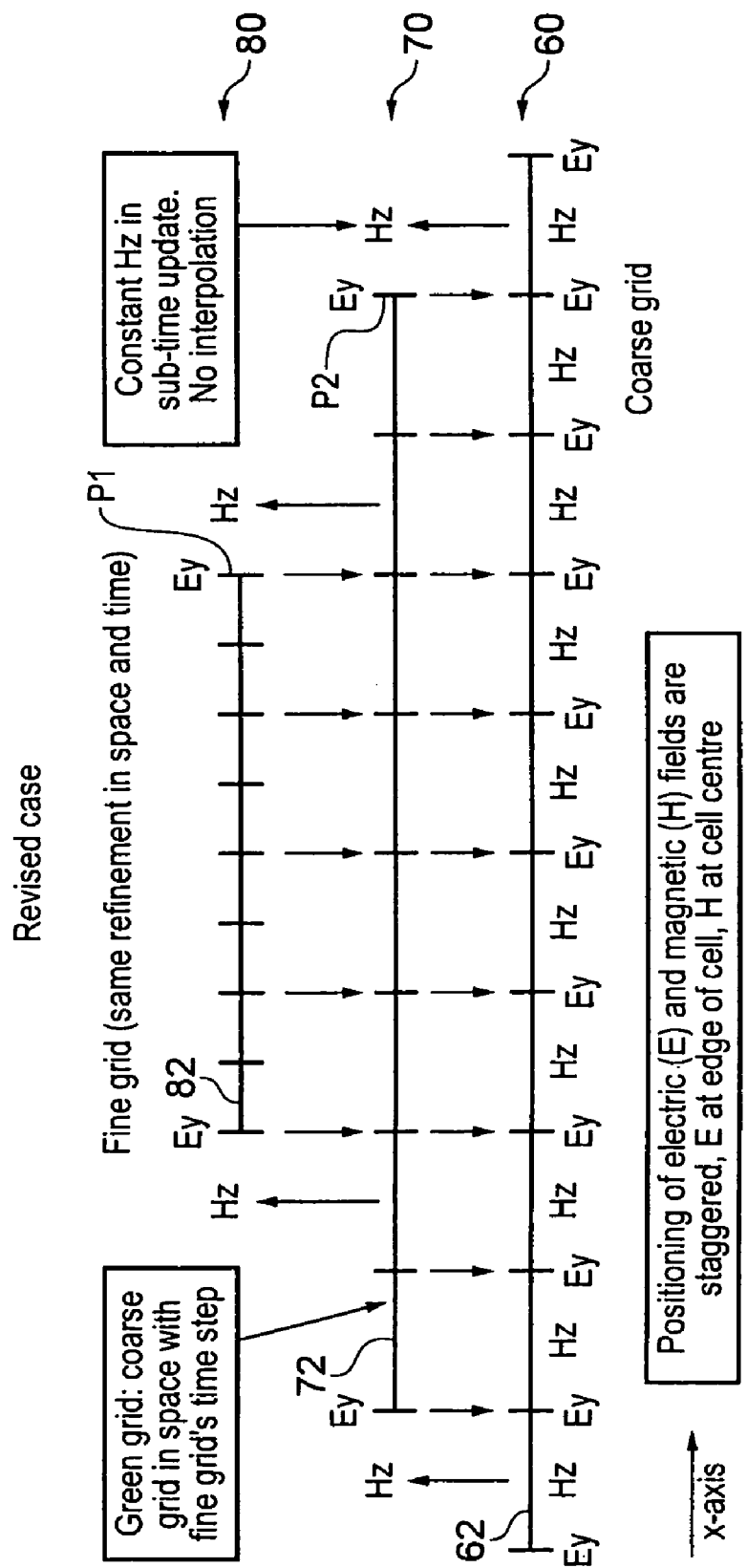
FIG. 6 illustrates a coupling procedure in one dimension.

FIG. 6 relates to a one-dimensional implementation of a method for assessing wave propagation arising in a physical system by obtaining a numerical approximation of the physical system to be simulated. The method involves a computational domain comprising a first one-dimensional grid 60 having a plurality of first-grid cells 62, a second one-dimensional grid 80 being a refinement of the first grid 60 and having a plurality of second-grid cells 82, and an intermediate one-dimensional grid 70 having a plurality of intermediate-grid cells 72. The intermediate grid 70 has the refinement level of the first grid 60 in space but with the time step of the second grid 80. The perimeter P1 of the second grid 80 is within the perimeter P2 of the intermediate grid 70 and the two perimeters P1, P2 are separated by a distance which is equal to the size of two cells 62, 72 of the first grid 60/intermediate grid 70, as will be explained later. Each cell 62, 72, 82 has solution points at which values representing a physical quantity of the physical system to be simulated may be obtained. As shown, the cells have electric field values (E) at the edges of the cells, and magnetic field values (H) at the centres of the cells. In this way, the E and H values are staggered. Although FIG. 6 shows the physical quantities as electric field (E) and magnetic field (H), it should be understood that the invention is not limited to these quantities. The arrows in FIG. 6 indicate the direction of information flow between the grids. From the first grid 60, the Hz values adjacent the perimeter of the intermediate grid 70 are used to obtain the Ey values at that perimeter, for example by using equation (9). At $E^{n+1}$, the internal Ey values of the intermediate grid 70 are obtained and mapped onto the first grid 60, thus completing the full coupling between the two grids 60, 70. Similarly, the perimeter values Ey at the second grid 80 are calculated using magnetic field values Hz from the intermediate grid 70, for example by using equation (9). In the one-dimensional method described with reference to FIG. 6, no linear or spatial interpolation is required to couple the grids.

Figure 7:
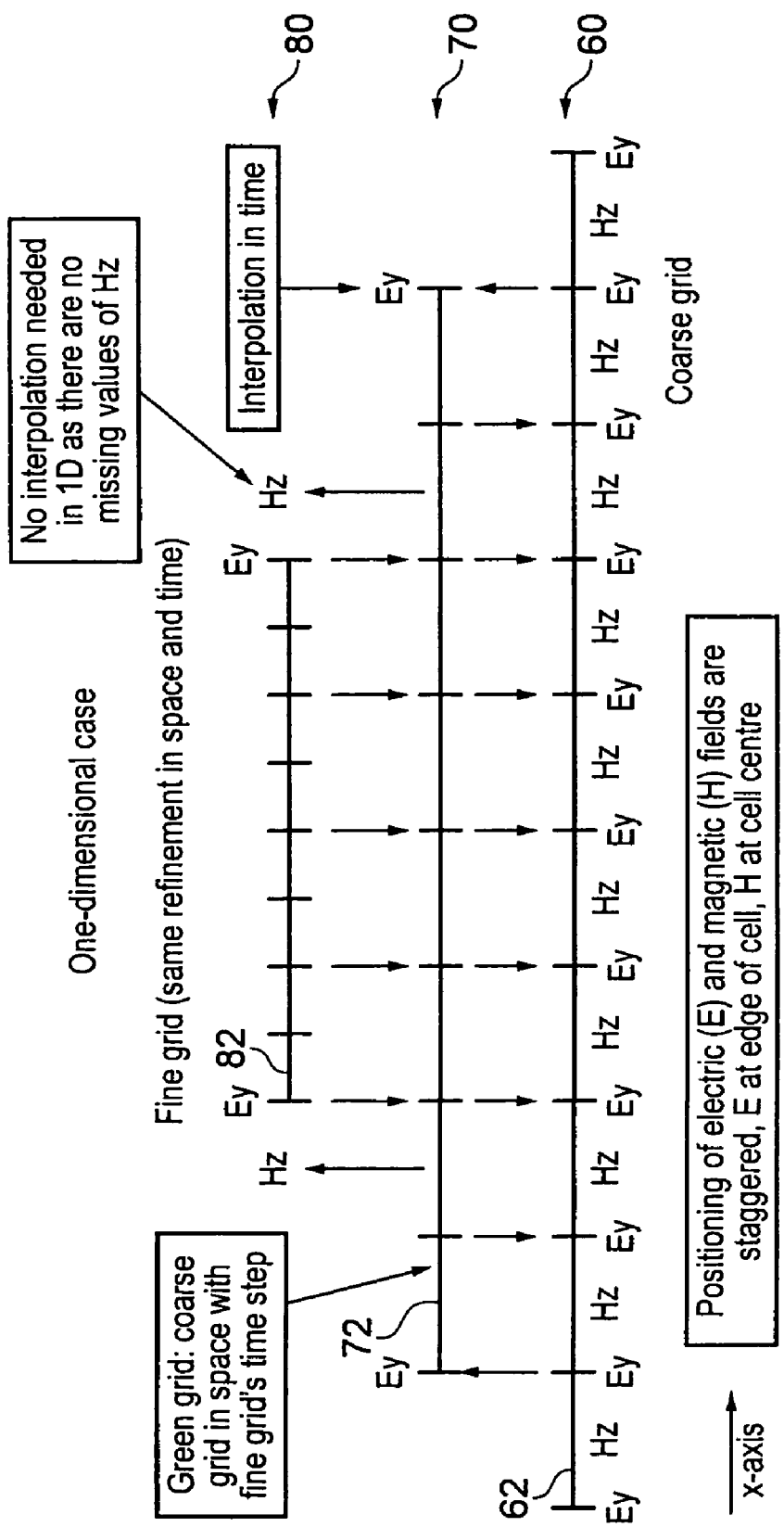
FIG. 7 illustrates an alternative coupling procedure in one dimension.

FIG. 7 relates to an alternative one-dimensional method for assessing wave propagation. The method is identical to that described with reference to FIG. 6, except that, instead of using Hz values from the first grid 60 to calculate the Ey values at the perimeter of the intermediate grid 70, temporal interpolation is used to obtain the Ey values at the perimeter of the intermediate grid 70 from Ey values at corresponding locations in the first grid 60. As mentioned above, the space of the intermediate grid 70 is the same as that of the first grid 60, but the intermediate grid 70 has the time increment of the second grid 80. Any missing temporal values of Ey at the perimeter of the intermediate grid 70 are calculated by the linear interpolation:

$$E^{n+\alpha} = E^n + \alpha(E^{n+1} - E^n) \text{ where } 0 \leq \alpha \leq 1$$

No spatial interpolation is needed in one dimension as there are no missing values of Hz.

Figure 8:
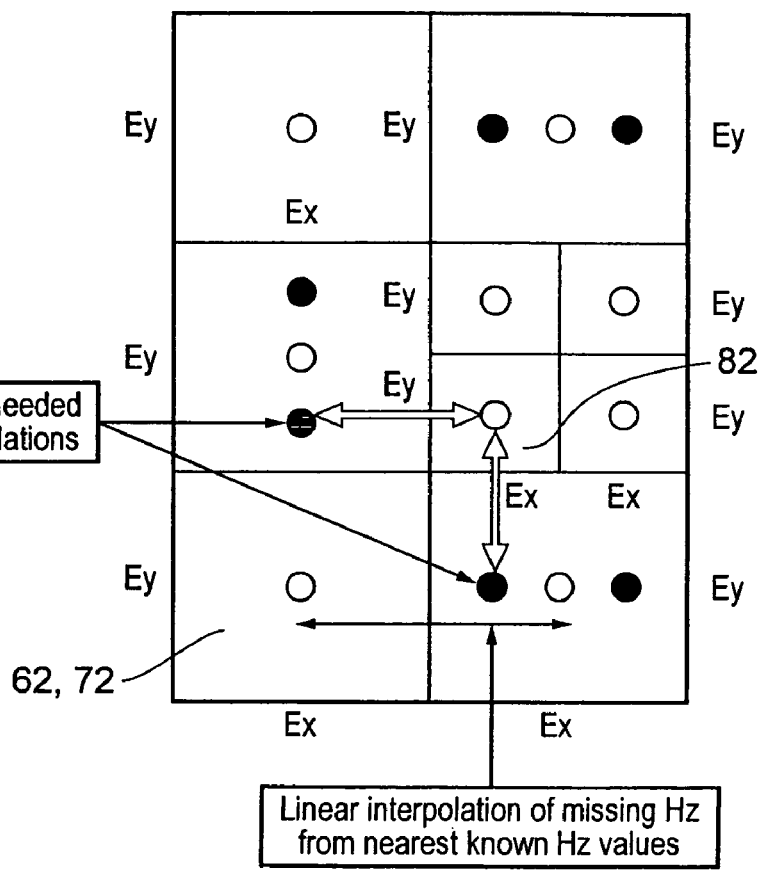
FIG. 8 illustrates a coupling procedure in two dimensions.

FIG. 8 relates to a two-dimensional method for assessing wave propagation. The lighter-coloured dots indicate known Hz values and the darker-coloured dots indicate the missing Hz values needed for Ex and Ey calculations. FIG. 8 illustrates spatial interpolation: it is assumed that temporal interpolation between the first and intermediate grids 60, 70 has already taken place. As indicated by the darker-coloured arrow, linear spatial interpolation is performed to obtain the missing Hz values from the nearest known Hz values. The lighter-coloured arrows indicate the calculation of Ex and Ey values.

The two-dimensional E-field equations used to calculate Ex and Ey may be $$E_x^{n+1} = E_x^n + \frac{\Delta t}{\varepsilon_x} \frac{\partial H_z^{n+0.5}}{\partial y};$$

$$E_y^{n+1} = E_y^n - \frac{\Delta t}{\varepsilon_y} \frac{\partial H_z^{n+0.5}}{\partial x}$$

In the calculation of Ex at the grid interface, the gradient of Hz in the y-direction is required. Similarly, for Ey, the gradient of Hz in the x-direction is needed.

Figure 9:
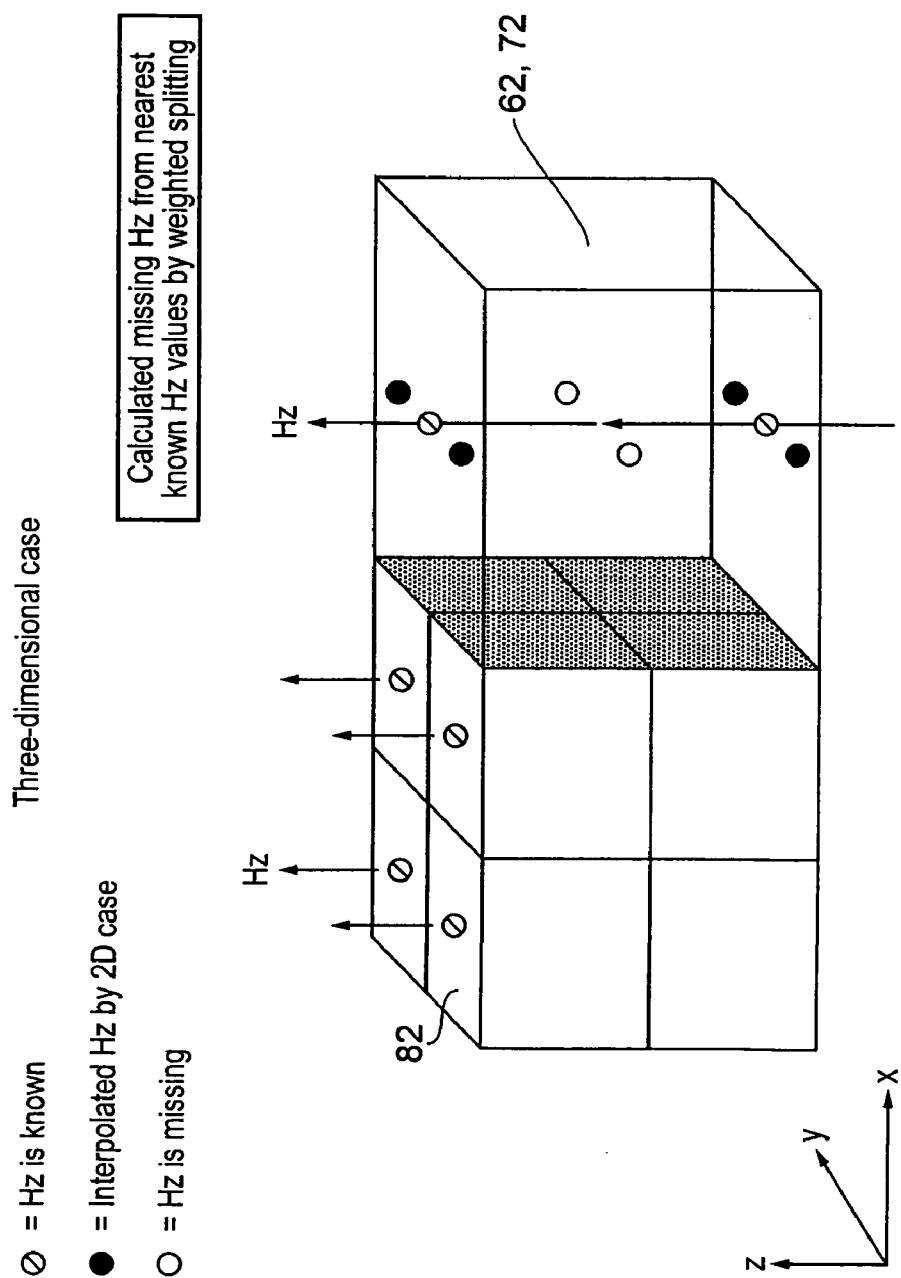
FIG. 9 illustrates a coupling procedure in three dimensions.

FIG. 9 relates to a three-dimensional method for assessing wave propagation. The darker-coloured dots indicate Hz values found by interpolation as described above with reference to the two-dimensional case. The lighter-coloured dots indicate missing Hz values. The intermediate-coloured dots indicate known Hz values. The missing Hz values are calculated from the nearest known Hz values by weighted splitting. The missing Hz values are used to calculate Ex, Ey values at the perimeter of the second grid 80, for example using equations (8) and (9). Ez values may be calculated using equation (10), for example.

For an FDTD scheme having any number of dimensions, the perimeter P1 of the second grid 80 is within the perimeter P2 of the intermediate grid 70, and the perimeter P2 of the intermediate grid 70 is wider than the perimeter P1 of the second grid 80 in any given dimension by a distance being equal to at least two times the size of one of the first-grid cells 62 in that dimension. This distance may be referred to as the number of coarse cells, or NCC.

Table 1, Table 2 and Table 3 below include results of numerical experiments conducted for one-, two- and three-dimensional multigrid FDTD schemes, respectively. The tables compare the number of coarse cells (NCC) against refinement levels. NCC may be thought of as the distance between the spatial coupling or interpolation position (the perimeter P1 of the second grid 80) and the temporal coupling or interpolation position (the perimeter P2 of the intermediate grid 70) in terms of the number of coarse cells (the cells 62 of the first grid 60). In the case of FIG. 6, for example, the NCC value is two.

Figure 10:
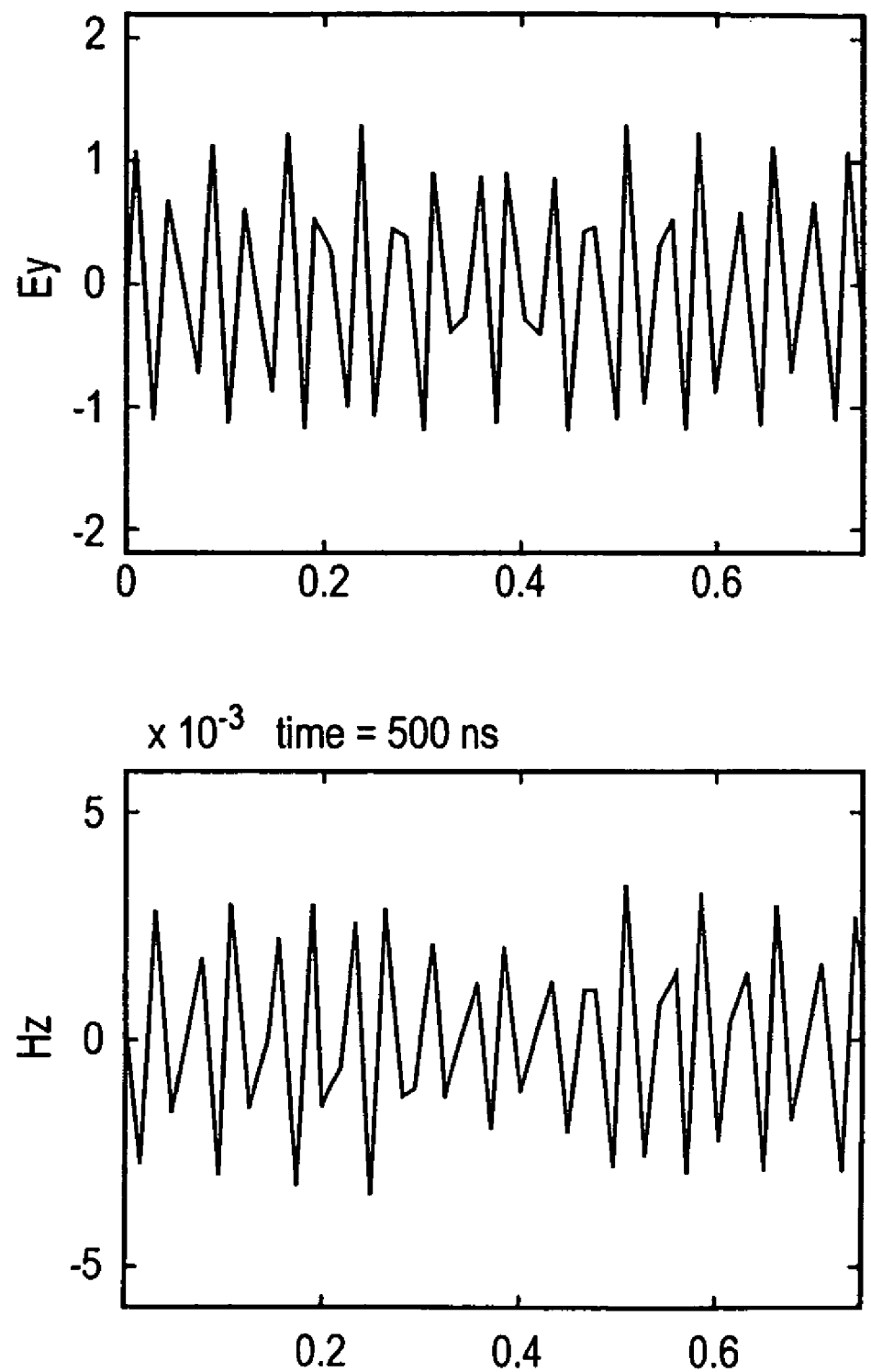
FIG. 10 illustrates a solution which is divergent due to late-time instability.
Figure 11:
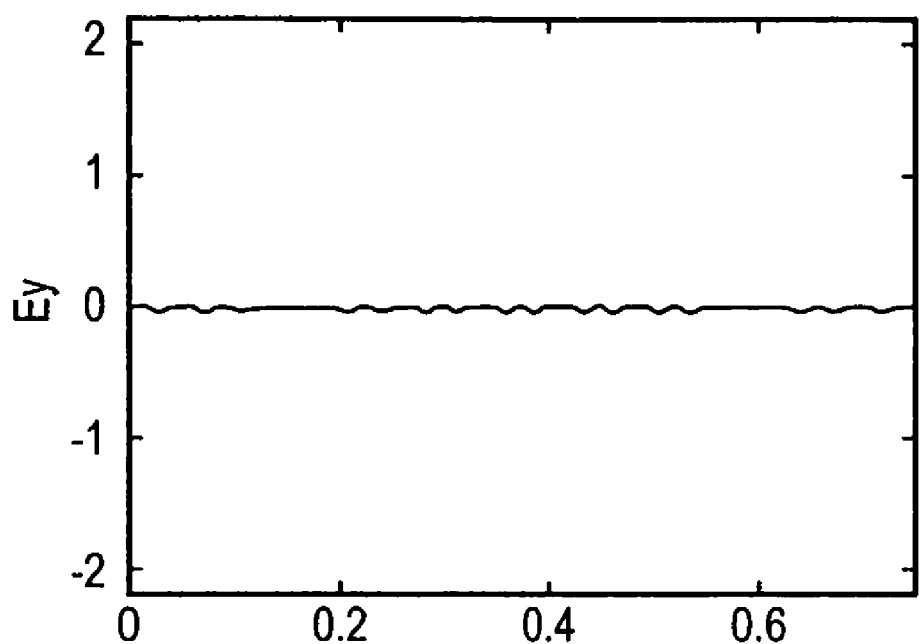
FIG. 11 illustrates a stable solution.
Figure 11:
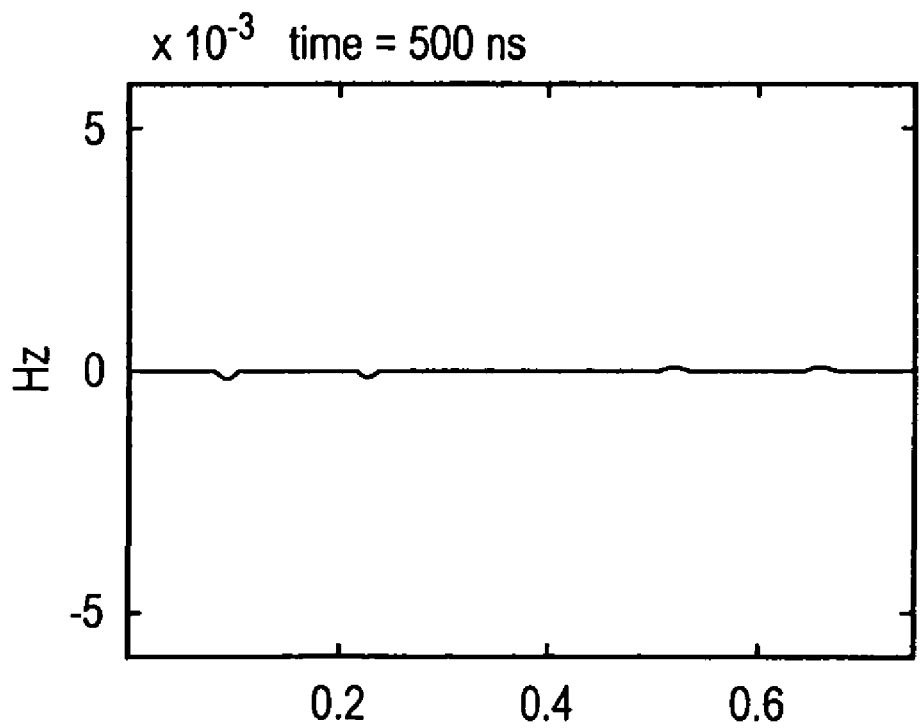

Ten million time steps were applied to the numerical experiments. The maximum absolute magnetic field values were output after one hundred thousand (100K) time steps, one million (1M) time steps and ten million (10M) time steps. The solution value for the maximum absolute magnetic field is zero after all the waves have exited the domain; this should be the case after 1000 time steps. If there are any late-time instabilities, the magnetic value moves away from zero. FIGS. 10 and 11 highlight the difference between unstable and stable cases, respectively.

The results in Table 1, Table 2 and Table 3 clearly show late-time instability with an NCC value of one, and, in the one-dimensional case, an NCC value of two. An NCC value of three or more provides a very stable multigrid-FDTD method in any number of dimensions. In two or more dimensions, an NCC value of two or more provides a stable solution.

TABLE 1

Results of a numerical experiment of a one-dimensional multigrid-FDTD scheme

| Number of coarse cells | Maximum absolute magnetic field values at refinement level for 0.1, 1.0 and 10.0 million time steps. Values in bracket are the time step at which instability was detected. | | | |
|---|---|---|---|---|
| (NCC) | 2 | 3 | 4 | 5 |
| 1 | (14,148) | (118,891) | (31,539) | (33,933) |
|  | — | — | — | — |
|  | — | — | — | — |
| 2 | 7.49e−6 | 2.62e−6 | 7.25e−7 | 8.63e−7 |
|  | (869,629) | 1.52e−5 | 3.68e−6 | 3.04e−6 |
|  | — | (2,493,241) | (3,554,780) | (4,172,996) |
| 3 | 5.99e−7 | 1.83e−7 | 1.25e−7 | 1.10e−7 |
|  | 5.64e−7 | 2.10e−7 | 1.20e−7 | 8.13e−8 |
|  | 9.39e−7 | 1.05e−7 | 7.55e−8 | 5.06e−8 |
| 4 | 1.72e−7 | 4.06e−7 | 7.72e−7 | 7.73e−7 |
|  | 6.71e−8 | 2.70e−8 | 2.14e−8 | 2.44e−8 |
|  | 4.42e−8 | 1.93e−8 | 1.77e−8 | 1.81e−8 |
| 5 | 4.85e−7 | 3.00e−7 | 2.46e−7 | 2.20e−7 |
|  | 1.97e−8 | 9.71e−8 | 1.28e−7 | 1.00e−7 |
|  | 1.30e−8 | 5.89e−9 | 4.18e−9 | 4.84e−9 |

TABLE 2

Results of a numerical experiment of a two-dimensional multigrid-FDTD scheme

| Number of coarse cells | Maximum absolute magnetic field values at refinement level for 0.1, 1.0 and 10.0 million time steps. Values in bracket are the time step at which instability was detected. | | | |
|---|---|---|---|---|
| (NCC) | 2 | 3 | 4 | 5 |
| 1 | 1.66e−6 | 6.66e−3 | 6.95e−4 | (91,288) |
|  | (220,924) | (118,891) | (175,539) | — |
|  | — | — | — | — |
| 2 | 7.84e−9 | 1.57e−8 | 1.36e−7 | 6.55e−8 |
|  | 6.94e−9 | 1.20e−8 | 8.60e−8 | 6.17e−8 |
|  | 1.09e−8 | 1.63e−8 | 1.26e−7 | 1.10e−7 |
| 3 | 3.06e−10 | 3.51e−10 | 1.45e−9 | 1.22e−9 |
|  | 3.37e−10 | 4.85e−10 | 2.36e−9 | 8.72e−10 |
|  | 2.18e−10 | 4.81e−10 | 2.65e−9 | 2.45e−9 |
| 4 | 4.56e−11 | 8.40e−11 | 7.17e−11 | 6.68e−11 |
|  | 1.77e−11 | 1.96e−11 | 3.71e−11 | 1.98e−11 |
|  | 9.68e−12 | 1.05e−11 | 4.58e−11 | 2.90e−11 |
| 5 | 4.22e−11 | 3.48e−11 | 1.40e−10 | 1.54e−10 |

TABLE 2-continued

Results of a numerical experiment of a two-dimensional multigrid-FDTD scheme

| Number of coarse cells (NCC) | Maximum absolute magnetic field values at refinement level for 0.1, 1.0 and 10.0 million time steps. Values in bracket are the time step at which instability was detected. | | | |
|---|---|---|---|---|
| | 2 | 3 | 4 | 5 |
| | 2.92e−11 | 1.90e−11 | 2.58e−11 | 2.18e−11 |
| | 4.51e−12 | 6.59e−12 | 1.45e−11 | 1.21e−11 |

TABLE 3

Results of a numerical experiment of a three-dimensional multigrid-FDTD scheme

| Number of coarse cells (NCC) | Port voltage and current at 0.1, 1.0 and 10.0 million time steps. Values in bracket are where instability has occurred. | |
|---|---|---|
| | 2 | 3 |
| 1 | −6.32e−11, −2.08e−12 | 7.63e−12, 3.11e−14 |
| | −1.70e−14, −1.35e−16 | −2.48e−13, −1.31e−14 |
| | −5.32e−15, −3.43e−17 | (−4.14e−00, −3.01e−02) |
| 2 | −1.40e−11, −1.70e−12 | −1.44e−13, −1.54e−15 |
| | −8.44e−17, 4.88e−18 | −3.17e−15, 1.64e−16 |
| | −4.40e−17, 5.94e−19 | −1.29e−14, −1.63e−16 |
| 3 | −1.31e−11, −1.68e−12 | −4.16e−14, −1.73e−15 |
| | −5.53e−17, 2.04e−17 | −3.81e−15, −9.12e−17 |
| | 6.99e−18, −4.38e−19 | −6.01e−17, 8.44e−19 |

Figure 12A:
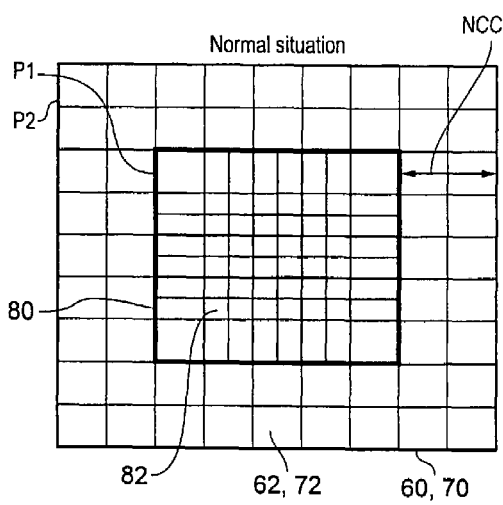
FIGS. 12A and 12B illustrate the positioning of a fine grid respectively away from and at the boundary of a computational domain.
Figure 12B:
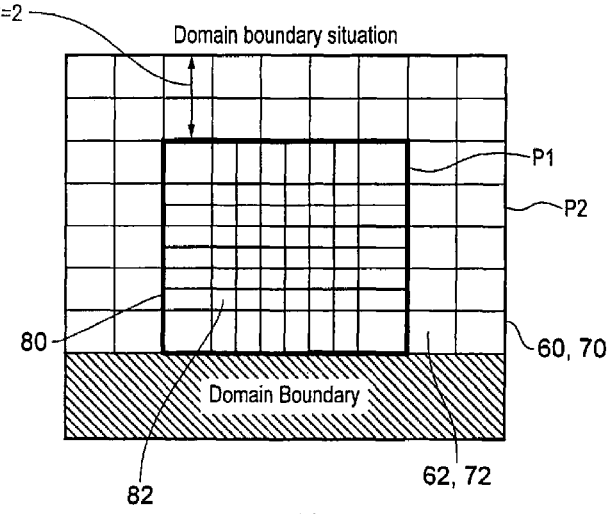

It is not possible to have the required NCC value in all dimensions at all times. For example, FIG. 12B illustrates a situation in a two-dimensional scheme in which the perimeter P1 of the second grid 80 abuts the domain boundary. In this case, the NCC value on the side of the second grid 80 adjacent the domain boundary is zero. However, as the values of the physical quantity are known at the boundary, rather than being calculated (as in the case of values away from the boundary), the stability of the scheme is not affected by the fact that the NCC value is below the prescribed minimum (i.e. 2) on the side of the grid adjacent the boundary. In fact, there may be a situation in which three sides of the second grid 80 are at the boundary, such that the NCC value only exists between the second grid 80 and the intermediate grid 70 on one side of the second grid 80. This is sufficient to obtain the benefits of increased stability described above. FIG. 12A illustrates the situation when the second grid 80 is away from the domain boundary. In any such situation, it is preferable that the NCC value meets the criteria described above on all sides of the second grid 80.

Figure 13:
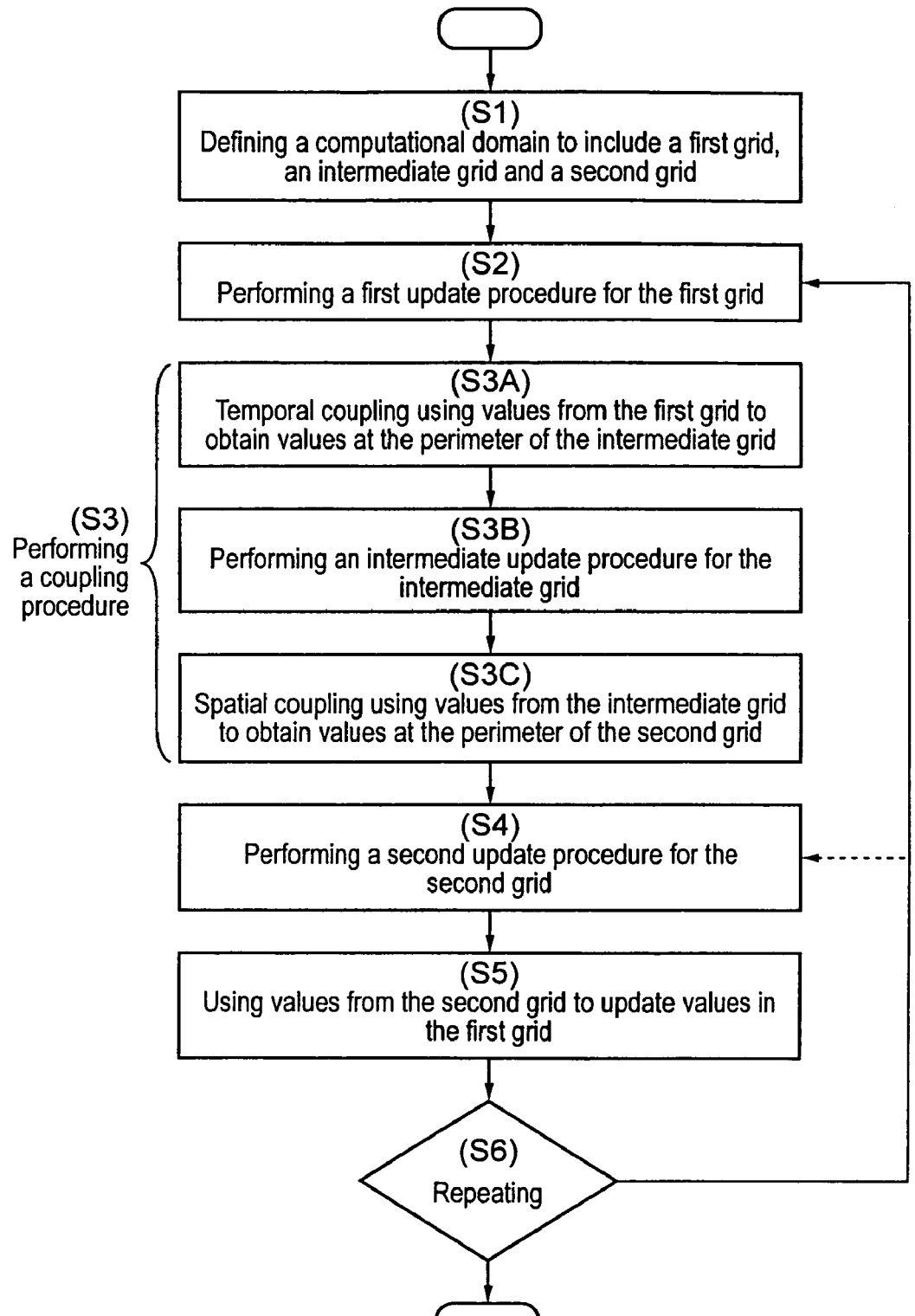
FIG. 13 is a flowchart representing a method for assessing wave propagation arising in a physical system by obtaining a numerical approximation of the physical system to be simulated.

FIG. 13 illustrates a method for assessing wave propagation arising in a physical system by obtaining a numerical approximation of the physical system to be simulated. The method comprises the step of defining a computational domain (S1) comprising a first grid 60 having a plurality of first-grid cells 62 and a first-grid time step, a second grid 80 being a refinement of the first grid 60 and having a plurality of second-grid cells 82 and a second-grid time step, and an intermediate grid 70 having a plurality of intermediate-grid cells 72 of equal size to the first-grid cells 62 and having the second-grid time step. Each cell 62, 72, 82 has one or more solution points at which values representing a physical quantity of the physical system to be simulated may be obtained.

The method further comprises performing a first update procedure (S2) to obtain values representing the physical quantity after a said first-grid time step, the values being obtained for at least one solution point of at least one first-grid cell 62, performing a coupling procedure (S3) using values from the first grid 60 to obtain values at a perimeter P1 of the second grid 80, and performing a second update procedure (S4), using the values at the perimeter P1 of the second grid 80, to obtain values representing the physical quantity after a said second-grid time step, the values being obtained for at least one solution point of at least one second-grid cell 82.

The coupling procedure (S3) comprises performing temporal coupling (S3A) by using values from the first grid 60 to obtain values at a perimeter P2 of the intermediate grid 70, performing an intermediate update procedure (S3B) to obtain values representing the physical quantity after the said second-grid time step of the second update procedure, the values being obtained for at least one solution point of at least one intermediate-grid cell 72, and performing spatial coupling (S3C) by using values from the intermediate grid 70 to obtain the values at the perimeter P1 of the second grid 80 used in the second update procedure.

In accordance with the invention, defining the computational domain (S1) comprises defining the perimeter P2 of the intermediate grid 70 to be wider than the perimeter P1 of the second grid 80 on at least one side of the second grid 80 by a distance equal to at least two times the size of one of the first-grid cells 62 in that dimension.

The method further comprises repeating (S6) steps S2 to S4 until the simulation is complete. In one version, it may be the case that the second update procedure is repeated before the first update procedure is repeated, as shown by the dashed arrow in FIG. 13.

In one embodiment, the temporal coupling (S3A) comprises obtaining the values at the perimeter P2 of the intermediate grid 70 by temporal interpolation using values at locations in the first grid 60 which correspond to the locations of the values at the perimeter P2 of the intermediate grid 70. The interpolated values represent the physical quantity of the physical system after the said second-grid time step of the second update procedure.

In one embodiment, the spatial coupling (S3C) comprises obtaining the values at the perimeter P1 of the second grid 80 by spatial interpolation using values from the intermediate grid 70.

In one embodiment, the method comprises using values from the second grid 80 to update values in the first grid 60 (S5), thereby improving the accuracy of the first grid 60.

The physical system comprises two physical quantities which are derivable from one another. In one embodiment, the method comprises performing the temporal coupling (S3A) using one of the two physical quantities and performing the spatial coupling (S3C) using the other of the two physical quantities. In one embodiment, one physical quantity is one of electric field strength and magnetic field strength and the other physical quantity is the other of electric field strength and magnetic field strength. However, it should be understood that the invention is not limited to these quantities.

Figure 14:
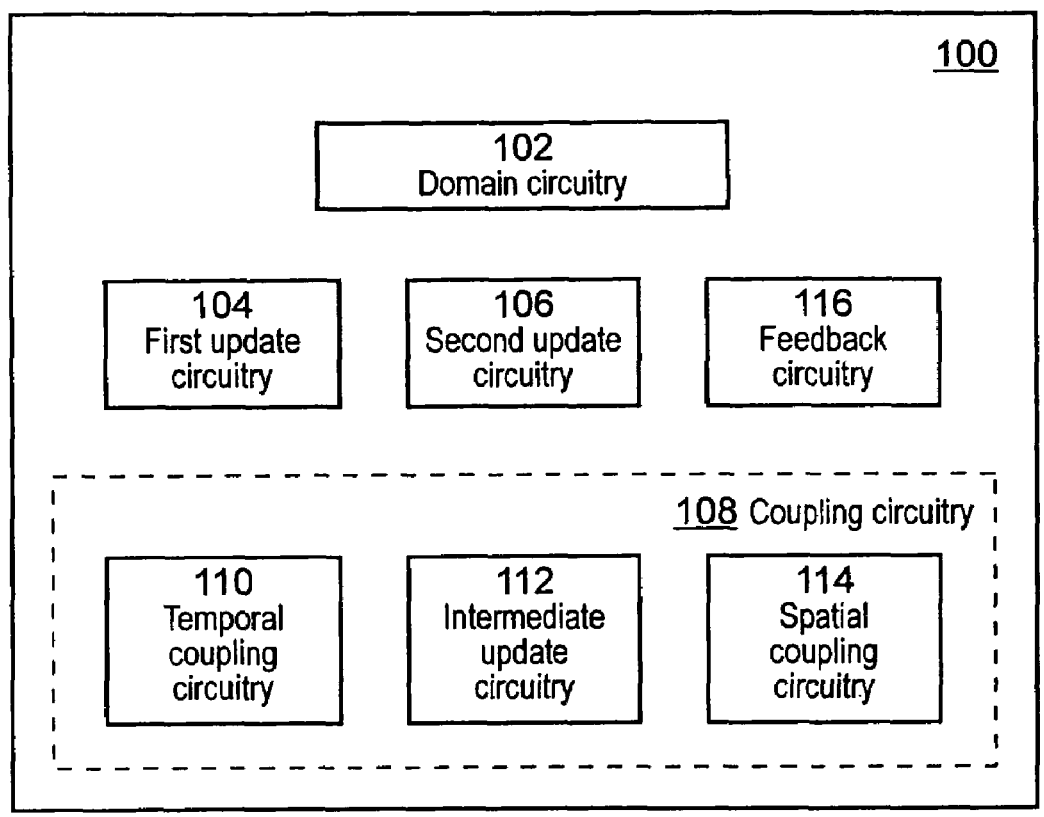
FIG. 14 is a schematic diagram of an apparatus for assessing wave propagation arising in a physical system by obtaining a numerical approximation of the physical system to be simulated.

FIG. 14 shows an apparatus 100 for assessing wave propagation arising in a physical system by obtaining a numerical approximation of the physical system to be simulated. The apparatus 100 comprises domain circuitry 102 configured to define the computational domain comprising the first grid 60, the second grid 82 and the intermediate grid 70; first update circuitry 104 configured to perform the first update procedure; second update circuitry 106 configured to perform the second update procedure; and coupling circuitry 108 configured to perform the coupling procedure. The coupling circuitry 108 comprises temporal coupling circuitry 110 configured to perform the temporal coupling; intermediate update circuitry 112 configured to perform the intermediate update procedure; and spatial coupling circuitry 114 configured to perform the spatial coupling. In accordance with the invention, the domain circuitry 102 is configured to define the perimeter P2 of the intermediate grid 70 to be wider than the perimeter P1 of the second grid 80 on at least one side of the second grid 80 by a distance being equal to at least two times the size of one of the first-grid cells 62 in that dimension. In one embodiment, the apparatus 100 comprises feedback circuitry 116 configured to use values from the second grid 80 to update values in the first grid 60, thereby improving the accuracy of the first grid 60. The apparatus 100 may be a computer which, when loaded with a computer program, becomes the apparatus 100.

Figure 15:
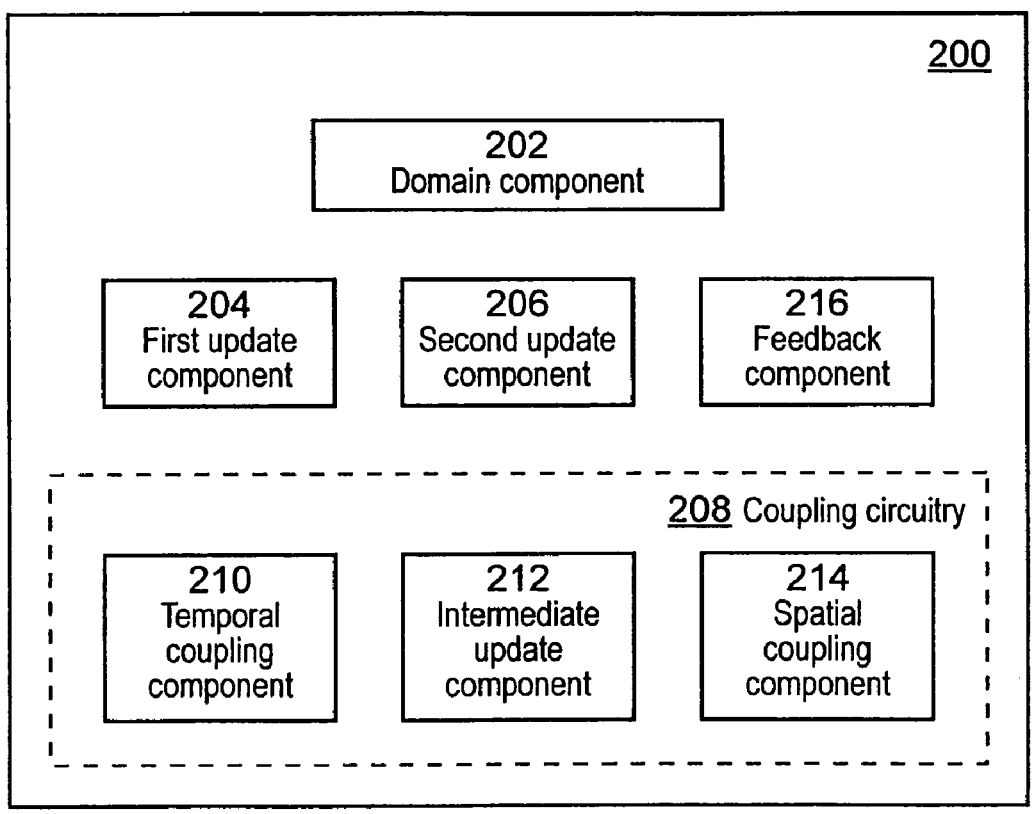
FIG. 15 is a schematic diagram of a computer program for assessing name propagation arising in a physical system by obtaining a numerical approximation of the physical system to be simulated.

FIG. 15 shows a computer program 200 for assessing wave propagation arising in a physical system by obtaining a numerical approximation of the physical system to be simulated. The program 200 comprises a domain component 202 configured to define the computational domain comprising the first grid 60, the second grid 82 and the intermediate grid 70; a first update component 204 configured to perform the first update procedure; a second update component 206 configured to perform the second update procedure; and a coupling component 208 configured to perform the coupling procedure. The coupling component 208 comprises a temporal coupling component 210 configured to perform the temporal coupling; an intermediate update component 212 configured to perform the intermediate update procedure; and a spatial coupling component 214 configured to perform the spatial coupling. In accordance with the invention, the domain component 202 is configured to define the perimeter P2 of the intermediate grid 70 to be wider than the perimeter P1 of the second grid 80 on at least one side of the second grid 80 by a distance being equal to at least two times the size of one of the first-grid cells 62 in that dimension. In one embodiment, the program 200 comprises a feedback component 216 configured to use values from the second grid 80 to update values in the first grid 60, thereby improving the accuracy of the first grid 60.

It should be appreciated that the various aspects of the present invention may be used alone or in combination in a single embodiment.

The invention claimed is:

1. A computer implemented method for assessing wave propagation arising in a physical system by obtaining a numerical approximation of the physical system to be simulated, the method comprising:

defining, using a computer, a computational domain comprising a first grid having a plurality of first-grid cells and a first-grid time step, a second grid being a refinement of the first grid and having a plurality of second-grid cells and a second-grid time step, and an intermediate grid having a plurality of intermediate-grid cells of equal size to the first-grid cells and having the second-grid time step, wherein each cell has one or more solution points at which values representing a physical quantity of the physical system to be simulated are obtained;

performing, using the computer, a first update procedure to obtain values representing the physical quantity after a said first-grid time step, the values being obtained for at least one solution point of at least one first-grid cell;

performing, using the computer, a coupling procedure using values from the first grid to obtain values at a perimeter of the second grid; and performing, using the computer, a second update procedure, using the values at the perimeter of the second grid, to obtain values representing the physical quantity after said second-grid time step, the values being obtained for at least one solution point of at least one second-grid cell;

wherein the coupling procedure comprises:

performing, using the computer, temporal coupling by using values from the first grid to obtain values at a perimeter of the intermediate grid;

performing, using the computer, an intermediate update procedure to obtain values representing the physical quantity after the said second-grid time step of the second update procedure, the values being obtained for at least one solution point of at least one intermediate-grid cell; and performing, using the computer, spatial coupling by using values from the intermediate grid to obtain the values at the perimeter of the second grid used in the second update procedure;

wherein defining the computational domain comprises defining the perimeter of the intermediate grid to be wider than the perimeter of the second grid on at least one side of the second grid by a distance equal to at least two times the size of one of the first-grid cells in that dimension.

2. The method of claim 1 wherein the temporal coupling comprises obtaining the values at the perimeter of the intermediate grid by temporal interpolation using values at locations in the first grid which correspond to the locations of the values at the perimeter of the intermediate grid, the interpolated values representing the physical quantity of the physical system after the said second-grid time step of the second update procedure.

3. The method of claim 1 wherein the spatial coupling comprises obtaining the values at the perimeter of the second grid by spatial interpolation using values from the intermediate grid.

4. The method of claim 1 wherein defining the computational domain comprises defining each of the first, second and intermediate grids to be one dimensional, and defining the perimeter of the intermediate grid to be wider than the perimeter of the second grid by a distance equal to at least three times the size of one of the first-grid cells in the one dimension.

5. The method of claim 1 wherein defining the computational domain comprises defining each of the first, second and intermediate grids to be at least two dimensional, and defining the perimeter of the intermediate grid to be wider than the perimeter of the second grid on at least one side of the second grid by a distance equal to at least two times the size of one of the first-grid cells in that dimension.

6. The method of claim 1, comprising using values from the second grid to update values in the first grid, thereby improving the accuracy of the first grid.

7. The method of claim 1 wherein the physical system comprises two physical quantities which are derivable from one another, the method comprising performing the temporal coupling using one of the two physical quantities and performing the spatial coupling using the other of the two physical quantities.

8. The method of claim 7 wherein one physical quantity is one of electric field strength and magnetic field strength and the other physical quantity is the other of electric field strength and magnetic field strength.

9. The method of claim 1 comprising defining the perimeter of the intermediate grid to be wider than the perimeter of the second grid by the specified distance on all sides of the second grid, except where the perimeter of the second grid is within the specified distance of a boundary of the computational domain.

10. An apparatus for assessing wave propagation arising in a physical system by obtaining a numerical approximation of the physical system to be simulated, the apparatus comprising:

a computer with at least one processor and a memory storing a program of instructions;

domain circuitry configured to define a computational domain comprising a first grid having a plurality of first-grid cells and a first-grid time step, a second grid being a refinement of the first grid and having a plurality of second-grid cells and a second-grid time step, and an intermediate grid having a plurality of intermediate-grid cells of equal size to the first-grid cells and having the second-grid time step, wherein each cell has one or more solution points at which values representing a physical quantity of the physical system to be simulated are obtained;

first update circuitry configured to perform a first update procedure to obtain values representing the physical quantity after a said first-grid time step, the values being obtained for at least one solution point of at least one first-grid cell;

coupling circuitry configured to perform a coupling procedure using values from the first grid to obtain values at a perimeter of the second grid; and second update circuitry configured to perform a second update procedure, using the values at the perimeter of the second grid, to obtain values representing the physical quantity after a said second-grid time step, the values being obtained for at least one solution point of at least one second-grid cell;

wherein the coupling circuitry comprises:

temporal coupling circuitry configured to perform temporal coupling by using values from the first grid to obtain values at a perimeter of the intermediate grid;

intermediate update circuitry configured to perform an intermediate update procedure to obtain values representing the physical quantity after the said second-grid time step of the second update procedure, the values being obtained for at least one solution point of at least one intermediate-grid cell; and spatial coupling circuitry configured to perform spatial coupling by using values from the intermediate grid to obtain the values at the perimeter of the second grid used in the second update procedure;

wherein the domain circuitry is configured to define the perimeter of the intermediate grid to be wider than the perimeter of the second grid on at least one side of the second grid by a distance being equal to at least two times the size of one of the first-grid cells in that dimension.

11. The apparatus of claim 10 wherein the temporal coupling circuitry is configured to perform the temporal coupling to obtain the values at the perimeter of the intermediate grid by temporal interpolation using values at locations in the first grid which correspond to the locations of the values at the perimeter of the intermediate grid, the interpolated values representing the physical quantity of the physical system after the said second-grid time step of the second update procedure.

12. The apparatus of claim 10 wherein the spatial coupling circuitry is configured to perform the spatial coupling to obtain the values at the perimeter of the second grid by spatial interpolation using values from the intermediate grid.

13. The apparatus of claim 10 wherein the domain circuitry is configured to define each of the first, second and intermediate grids to be one dimensional, and to define the perimeter of the intermediate grid to be wider than the perimeter of the second grid on at least one side of the second grid by a distance equal to at least three times the size of one of the first-grid cells in the one dimension.

14. The apparatus of claim 10 wherein the domain circuitry is configured to define each of the first, second and intermediate grids to be at least two dimensional, and to define the perimeter of the intermediate grid to be wider than the perimeter of the second grid on at least one side of the second grid by a distance equal to at least two times the size of one of the first-grid cells in that dimension.

15. The apparatus of claim 10 comprising feedback circuitry configured to use values from the second grid to update values in the first grid, thereby improving the accuracy of the first grid.

16. The apparatus of claim 10 wherein the physical system comprises two physical quantities which are derivable from one another, and wherein the temporal coupling circuitry is configured to perform the temporal coupling using one of the two physical quantities and wherein the spatial coupling circuitry is configured to perform the spatial coupling using the other of the two physical quantities.

17. The apparatus of claim 16 wherein one physical quantity is one of electric field strength and magnetic field strength and the other physical quantity is the other of electric field strength and magnetic field strength.

18. The apparatus of claim 10 wherein the domain circuitry is configured to define the perimeter of the intermediate grid to be wider than the perimeter of the second grid by the specified distance on all sides of the second grid, except where the perimeter of the second grid is within the specified distance of a boundary of the computational domain.

19. A computer readable storage medium storing computer executable instructions which, when run on computer, causes the computer to perform the method as claimed in claim 1.

20. A computer readable storage medium storing computer executable instructions which, when loaded into a computer, causes the computer to become the apparatus as claimed in claim 10.

* * * * *

UNITED STATES PATENT AND TRADEMARK OFFICE
CERTIFICATE OF CORRECTION

| | |
|---|---|
| PATENT NO. | : 7,657,409 B2 |
| APPLICATION NO. | : 12/292756 |
| DATED | : February 2, 2010 |
| INVENTOR(S) | : Peter Chow |

Page 1 of 1

It is certified that error appears in the above-identified patent and that said Letters Patent is hereby corrected as shown below:

Title Page, Column 2 (Other Publications), Line 3, change "Compuatational" to --Computational--.

Title Page, Column 2 (Abstract), Line 14, change "second-grind" to --second-grid--.

Title Page, Column 2 (Abstract), Line 15, change "second-grind" to --second-grid--.

Column 20, Line 53, change "claim 1," to --claim 1--.

Signed and Sealed this

Twenty-seventh Day of April, 2010

David J. Kappos
*Director of the United States Patent and Trademark Office*